United States Patent
Yancey et al.

(10) Patent No.: US 7,689,757 B2
(45) Date of Patent: *Mar. 30, 2010

(54) SYSTEMS AND METHODS FOR DATA TRANSFER

(75) Inventors: Jerry W. Yancey, Greenville, TX (US); Yea Z. Kuo, Fort Worth, TX (US)

(73) Assignee: L-3 Communications Intergrated Systems, L.P., Greenville, TX (US)

(*) Notice: Subject to any disclaimer, the term of this patent is extended or adjusted under 35 U.S.C. 154(b) by 598 days.

This patent is subject to a terminal disclaimer.

(21) Appl. No.: 11/529,713

(22) Filed: Sep. 28, 2006

(65) Prior Publication Data

US 2007/0276959 A1    Nov. 29, 2007

Related U.S. Application Data

(63) Continuation of application No. 10/843,226, filed on May 11, 2004, now Pat. No. 7,444,454.

(51) Int. Cl.
  *G06F 13/36* (2006.01)
(52) U.S. Cl. .................................................. 710/312
(58) Field of Classification Search .................. 710/312
  See application file for complete search history.

(56) References Cited

U.S. PATENT DOCUMENTS

| 4,528,658 | A | 7/1985 | Israel |
| 5,737,235 | A | 4/1998 | Kean et al. |
| 5,838,167 | A | 11/1998 | Erickson et al. |
| 5,941,988 | A | 8/1999 | Bhagwat et al. |
| 5,953,372 | A | 9/1999 | Virzi |
| 6,020,755 | A | 2/2000 | Andrews et al. |
| 6,075,380 | A * | 6/2000 | Lane ........................... 326/40 |
| 6,172,927 | B1 | 1/2001 | Taylor |
| 6,201,829 | B1 | 3/2001 | Schneider |
| 6,233,704 | B1 | 5/2001 | Scott et al. |

(Continued)

FOREIGN PATENT DOCUMENTS

GB    2377138 A    12/2002

OTHER PUBLICATIONS

Search Report, PCT/US05/15470, Feb. 21, 2007, 3 pgs.

(Continued)

*Primary Examiner*—Mark Rinehart
*Assistant Examiner*—Christopher A Daley
(74) *Attorney, Agent, or Firm*—O'Keefe, Egan, Peterman & Enders LLP

(57) ABSTRACT

Application Specific Integrated Circuit ("ASIC") devices, such as Field Programmable Gate Arrays ("FPGAs"), may be interconnected using serial I/O connections, such as high speed multi-gigabit serial transceiver ("MGT") connections. For example, serial I/O connections may be employed to interconnect a pair of ASICs to create a high bandwidth, low signal count connection, and in a manner so that any given pair of multiple ASIC devices on a single circuit card may communicate with each other through no more than one serial data communication link connection step. A reconfigurable hardware architecture ("RHA") may be configured to include a communications infrastructure that uses a high-bandwidth packet router to establish standard communications protocols between multiple interfaces and/or multiple devices that may be present on a single circuit card. Additionally, a communications infrastructure may be established across multiple circuit cards.

28 Claims, 12 Drawing Sheets

U.S. PATENT DOCUMENTS

| | | | |
|---|---|---|---|
| 6,259,693 | B1 | 7/2001 | Ganmukhi et al. |
| 6,292,923 | B1 | 9/2001 | Genrich et al. |
| 6,333,641 | B1 | 12/2001 | Wasson |
| 6,381,238 | B1 | 4/2002 | Hluchyj |
| 6,385,236 | B1 | 5/2002 | Chen |
| 6,389,379 | B1 | 5/2002 | Lin et al. |
| 6,421,251 | B1 | 7/2002 | Lin |
| 6,496,291 | B1 | 12/2002 | Raj et al. |
| 6,496,505 | B2 | 12/2002 | La Porta et al. |
| 6,617,877 | B1 | 9/2003 | Cory et al. |
| 6,651,225 | B1 | 11/2003 | Lin et al. |
| 6,721,313 | B1 | 4/2004 | Van Duyne |
| 6,873,180 | B2 | 3/2005 | Bentz |
| 6,888,376 | B1 | 5/2005 | Venkata et al. |
| 6,901,072 | B1 | 5/2005 | Wong |
| 6,934,763 | B2 | 8/2005 | Kubota et al. |
| 6,965,571 | B2 | 11/2005 | Webber |
| 6,993,032 | B1 * | 1/2006 | Dammann et al. ....... 370/395.7 |
| 7,003,585 | B2 | 2/2006 | Phong et al. |
| 7,020,147 | B1 | 3/2006 | Amadon et al. |
| 7,035,228 | B2 | 4/2006 | Baumer |
| 7,111,110 | B1 * | 9/2006 | Pedersen ................... 711/104 |
| 7,137,048 | B2 | 11/2006 | Zerbe et al. |
| 7,188,283 | B1 | 3/2007 | Shafer et al. |
| 7,260,650 | B1 | 8/2007 | Luechenhoff |
| 2002/0021680 | A1 | 2/2002 | Chen |
| 2002/0057657 | A1 | 5/2002 | La Porta et al. |
| 2002/0059274 | A1 | 5/2002 | Hartsell et al. |
| 2002/0095400 | A1 | 7/2002 | Johnson et al. |
| 2003/0009585 | A1 | 1/2003 | Antoine et al. |
| 2003/0026260 | A1 | 2/2003 | Ogasawara et al. |
| 2003/0167340 | A1 | 9/2003 | Jonsson |
| 2004/0085902 | A1 | 5/2004 | Miller et al. |
| 2004/0131072 | A1 | 7/2004 | Khan et al. |
| 2004/0156368 | A1 | 8/2004 | Barri et al. |
| 2004/0158784 | A1 | 8/2004 | Abuhamdeh et al. |
| 2004/0240468 | A1 | 12/2004 | Chin et al. |
| 2004/0249964 | A1 * | 12/2004 | Mougel ....................... 709/231 |
| 2005/0044439 | A1 | 2/2005 | Shatas et al. |
| 2005/0169311 | A1 | 8/2005 | Millet et al. |
| 2005/0175018 | A1 | 8/2005 | Wong |
| 2005/0183042 | A1 | 8/2005 | Vogel et al. |
| 2005/0242834 | A1 * | 11/2005 | Vadi et al. ..................... 326/37 |
| 2005/0248364 | A1 | 11/2005 | Vadi et al. |
| 2005/0256969 | A1 | 11/2005 | Yancey et al. |
| 2006/0002386 | A1 | 1/2006 | Yik et al. |
| 2007/0101242 | A1 | 5/2007 | Yancey |

OTHER PUBLICATIONS

Search Report, PCT/US2005/015470, Nov. 5, 2007, 2 pgs.

Copending U.S. Appl. No. 11/600,935; LCOM:056, entitled "Methods and Systems for Relaying Data Packets", filed Nov. 16, 2006; 101 pgs.

B. Hall, "BTeV Front End Readout & Links", BTEV Co., Aug. 17, 2000, 11 pgs.

Irwin, "Usage Models for Multi-Gigabit Serial Transceivers", Xilinx, xilinix.com, White Paper, WP157 (v1.0), Mar. 15, 2002, 10 pgs.

Campenhout, "Computing Structures and Optical Interconnect: Friends or Foes?", Department of Electronics and Information Systems, Ghent University, Obtained from Internet Oct. 8, 2006, 11 pgs.

E. Hazen, "HCAL HO Trigger Link", Optical SLB-HTR Interface Specification, May 24, 2006, 4 pgs.

G. Russell, "Analysis and Modelling of Optically Interconnected Computing Systems", School of Engineering and Physical Sciences, Heriot-Watt University, May 2004, 170 pgs.

Copending U.S. Appl. No. 11/529,712; entitled "Systems and Methods for Interconnection of Multiple FPGA Devices", filed Sep. 28, 2006; 42 pgs.

Laxdal, "ELEC 563 Project Reconfigurable Computers", http://www.ece.uvic.ca/~elaxdal/Elec563/reconfigurable_computers. html; printed from the Internet Dec. 19, 2003, Dec. 2, 1999, 10 pgs.

"PCI/DSP-4 Four Complete Channels of Digital Acoustic Emission Data Acquisition on a Single Board", http://www.pacndt.com/products/Multichannel/pcidsp.html, printed from the Internet Dec. 19, 2003, 3 pgs.

Zaiq Technologies, "Innovation: Methodology Briefs", http://www.zaiqtech.com/innovation/m_fpga.html, printed from the Internet Jan. 15, 2004, 12 pgs.

Hardt et al, "Flysig: Dataflow Oriented Delay-Insensitive Processor for Rapid Prototyping of Signal Processing", (obtained from Internet Dec. 2003), 6 pgs.

Chang et al., "Evaluation of Large Matrix Operations on a Reconfigurable Computing Platform for High Performance Scientific Computations," (obtained from Internet Dec. 2003), 10 pgs.

Alfke, "FPGA Configuration Guidelines," XAPP 090 Nov. 24, 1997, Version 1.1, pp. 31-38.

"XC18V00 Series of In-System Programmable Configuration PROMs", Xilinx Product Specification, DS026 (v.3.0), Nov. 12, 2001, 19 pgs.

Thacker, "System ACE Technology: Configuration Manager Breakthrough", New Technology, FPGA Configuration, Xcell Journal, Summer 2001, pp. 52-55.

"System ACE MPM Solution", Xilinx Product Specification, DS087 (v1.0) Sep. 25, 2001, 29 pgs.

"RapidIO™: An Embedded System Component Network Architecture", Architecture and Systems Platform, Feb. 22, 2000, 25 pgs.

"Raceway Interlink Functional Specification", Mercury Computer Systems, Inc., Nov. 8, 2000, 118 pgs.

"[XMC-3310] High Speed Transceiver ePMC Module", Spectrum Signal Processing, http://www.spectrumsignal.com/Products/_Datasheets/XMS-3310_datasheet.asp, (© 2002-2004), 5 pgs. (this reference describes a product available prior to the May 11, 2004 filing date of the present application).

"XMC-3310 High Speed Transceiver ePMC Module", Spectrum Signal Processing, Rev. May 2004, 4 pgs. (this reference describes a product available prior to the May 11, 2004 filing date of the present application).

RocketIO™ Transceiver User Guide, Xilinx, UG024 (v2.3) Feb. 24, 2004, 152 pgs.

"The FPGA Systems Connectivity Tool", Product Brief, Nallatech, DIMEtalk 2.1, Feb. 2004, pp. 1-8.

Copending U.S. Appl. No. 10/843,226; LCOM:011; entitled "Systems and Methods for Interconnection of Multiple FPGA Devices", filed May 11, 2004, 51 pgs.

* cited by examiner

| Header | | | | | | | |
|---|---|---|---|---|---|---|---|
| Source FPGA | Source | Destination FPGA | Destination | | Packet Type | Words to Follow | Lock |
| 31 30 | 29 26 | 25 22 | 21 | 12 | 11 10 | 9 1 | 0 |
| 00 - FPGA 1<br>01 - FPGA 2<br>10 - FPGA 3<br>11 - FPGA 4 | 0000 - MGT1<br>0001 - MGT2<br>0010 - MGT3<br>0011 - PPC1<br>0100 - PPC2<br>0101 - VME<br>0110 - Race++<br>0111 - PCI<br>1000 - LVDS<br>1001 - User | 25 - FPGA 1<br>24 - FPGA 2<br>23 - FPGA 3<br>22 - FPGA 4 | 21 - MGT1<br>20 - MGT2<br>19 - MGT3<br>18 - PPC1<br>17 - PPC2<br>16 - VME<br>15 - Race++<br>14 - PCI<br>13 - LVDS<br>12 - User | | 0 - Data<br>1 - Control | 3 - 510 | 0 - Open<br>1 - Locked |

FIG. 6

SYSTEMS AND METHODS FOR DATA TRANSFER

This patent application is a continuation of U.S. Ser. No. 10/843,226, entitled "Systems And Methods For Interconnection Of Multiple FPGA Devices", filed on May 11, 2004 now U.S. Pat. No. 7,444,454 which is incorporated herein by reference.

BACKGROUND OF THE INVENTION

1. Field of the Invention

This invention relates generally to interconnection of multiple electrical devices, and more particularly to interconnection of multiple ASIC devices, for example, multiple Field Programmable Gate Array (FPGA) devices.

2. Description of the Related Art

In the past, multiple FPGA devices have been interconnected as an array on a single circuit card using point-to-point or bussed parallel wiring configurations. Such configurations use many wires (along with associated I/O counts and termination components) to achieve required data transfer bandwidths, thus requiring the creation of many connection layers on a circuit card leading to undesirable outcomes such as a high degree of mechanical complexity and cost. Examples of these parallel interfaces include those using signaling standards such as Gunning Transceiver Logic ("GTL"), Stub-Series Termination Logic ("SSTL"), and High-Speed Transceiver Logic ("HSTL"). Some of these standards require as many as three termination components per signal to implement.

Additional parallel wiring is typically employed when a FPGA array is used to implement multiple card-level interfaces and embedded processor nodes, further increasing circuit complexity. In addition, diverse types of interfaces (VME64x, Race++, and PCI), processors and user hardware modules are often required to communicate with each other on a single card, further complicating inter-card communications issues. For example, current commercial products commonly bridge two standard interfaces together, such as VERSA-Module Europe ("VME") and Peripheral Component Interconnect ("PCI") interfaces using parallel bridging chips. Additionally, system-level FPGAs with embedded Power PC ("PPC") or similar functions require implementation of more processing and interface nodes on a single card. Banking of I/O pins has reduced the need for termination components, but large I/O counts still require many layers to route, driving printed circuit board ("PCB") layer counts and costs upward.

In addition to parallel wiring configurations, FPGAs on a single card have been interconnected using IEEE 1149 (Joint Test Action Group—"JTAG") serial interconnections for configuration purposes. However, such JTAG serial interconnections are not suitable for functions such as high-speed data transfer or signal processing. Thus, the use of multiple large FPGAs, embedded processors, and various standard interfaces on a single card present significant problems with card layout/routing and inter-card communication.

SUMMARY OF THE INVENTION

Disclosed are methods and systems for interconnecting Application Specific Integrated Circuit ("ASIC") devices using simplex and/or duplex serial I/O connections, including high speed serial connections such as multi-gigabit serial transceiver ("MGT") connections. Examples of ASIC devices that may be interconnected using the disclosed systems and methods include, but are not limited to, Field Programmable Gate Arrays ("FPGAs") or other field programmable devices ("FPDs") or programmable logic devices ("PLDs"). In one embodiment of the practice of the disclosed systems and methods, serial I/O connections may be employed to interconnect a pair of ASICs to create a low signal count connection. For example, in one exemplary embodiment, high speed serial I/O connections (e.g., such as MGT connections) may be employed to interconnect a pair of ASICs to create a high bandwidth, low signal count connection.

In one embodiment of the disclosed systems and methods, any given pair of multiple ASIC devices on a single circuit card (e.g., selected from three or more ASIC devices present as a ASIC array on a single circuit card) may be interconnected by one or more serial data communication links (simplex and/or duplex serial data communication links formed between respective serial I/O connections of a given pair of ASIC devices) so that the given pair of ASIC devices may communicate with each other through the two serial I/O connections of each of the serial data communication links with no other serial connection intervening in between, or in other words, in a "one-step" fashion. Such a capability may be implemented, for example, such that each embedded processor, processor node, card level-interface, user-defined hardware module, etc. is provided with access to each of the other such entities on the card through one or more separate respective "one step" data communication links that each includes no more than two respective serial connections coupled together (e.g., no more than two respective high speed serial connections coupled together) in the data communication path and through a minimum number of packet transfer points. In a further embodiment, such a respective data communication link may be further characterized as a "direct serial interconnection" between two such entities, meaning that no multi-port switch device (e.g., crossbar switch, etc.) exists in the serial data communication path between the boundaries of the two entities. Advantageously, the disclosed systems and methods may be so implemented in one embodiment to achieve communication between given pairs of devices with relatively high data transfer bandwidths and minimal wiring. Furthermore, the disclosed systems and methods may be utilized (e.g., extended) to establish a communications infrastructure across multiple circuit cards.

The disclosed systems and methods may be implemented in a variety of environments including, but not limited to, signal processing applications, communication applications, interfacing applications, networking applications, cognitive computing applications, test and measurement applications, etc. For example, the disclosed systems and methods may be implemented as part of a reconfigurable hardware architecture ("RHA"), such as a reconfigurable signal processing circuit, that serves as a consistent framework in which ASIC applications may be user-defined and/or deployed in such a way as to enhance code portability, design re-use, and inter-communication, as well as to support board-level simulations extending beyond and between individual ASIC boundaries.

In one embodiment, a RHA may be configured to include a packet-based communications infrastructure that uses a high-bandwidth switch fabric (e.g., crossbar, etc.) packet router to establish standard communications protocols between multiple interfaces and/or multiple devices that may be present on a single circuit card (e.g., interfaces, processor nodes, and user-defined functions found on signal processing cards). Such a RHA may be further configured in one embodiment to provide a useful communications framework that promotes commonality across multiple (e.g., all) signal processing applications without restricting user utility. For example, packets conforming to a given interface (e.g., Race++ standard) may be processed by stripping the packet header off and then routing the remaining packet between ASIC devices using the standardized packet router infrastructure of the disclosed methods and systems. Advantageously, such a RHA may be implemented in a manner that does not preclude the addition of high-performance user connectivity, e.g., by only using a relatively small fraction of the available serial I/O connections (e.g., MGT connections) and ASIC (e.g., FPGA) gate resources. In one specific embodiment, embedded serial I/O connections (e.g., embedded MGT connections) of multiple FPGA devices may be used to interconnect the FPGA devices in a manner that advantageously reduces on-card I/O counts and the need for large numbers of termination components. However, it will be understood that non-embedded serial I/O connections may also be employed in the practice of the disclosed systems and methods.

In the practice of one exemplary embodiment of the disclosed systems and methods, multiple FPGAs of a FPGA array may be coupled together on a single card to communicate at the card-level basis using packet routing through one or more switch fabrics, e.g., crossbar switches, etc. In such an embodiment, each given pair of FPGA devices of a FPGA array may be linked in a manner that advantageously minimizes packet transfer latency times in the switch fabric, while at the same time allowing every source to have access to every destination in the array. In such an embodiment, a universal bridging method may be used in each FPGA to allow intercommunication between any two processors/interfaces on a single circuit card. In one exemplary embodiment, the bridging method may be implemented with a First-In First-Out ("FIFO") packet relay protocol that may be readily integrated into or mapped onto the slave functionality of standard interfaces and/or processor buses.

Thus, the disclosed systems and methods may be implemented using a predictable and uniform or standardized interface across the boundaries between each pair of board-level components (e.g., FPGAs, ASICs, general-purpose processors, etc.) to help promote consistent communications, board-level testability, design portability/re-use, and to provide a user with a relatively high degree of flexibility in establishing functional partitions for hardware modules mapped into an ASIC (e.g., FPGA) array. Further, built-in support for packet integrity checking and automatic retransmission of bad packets may be provided to facilitate the usage of the inter-ASIC links with hardware modules (e.g., signal processors such as Software-Defined Radios (SDRs), signal processing algorithms such as Fast-Fourier Transforms (FFTs) and wavelet transforms, data stream encryption and decryption, packet routing, etc.) that are sensitive to data corruption. For example, packet integrity checking (e.g., checksum, CRC, etc.) may be incorporated into the hardware layer (e.g., physical layer 1 of Open System Interconnection "OSI" protocol), for example, so that data may be transferred between hardware devices using a packet integrity checking method that is handled automatically by the hardware without the need for an upper layer of software to perform the packet integrity checking. For example, packet integrity protocol tasks (e.g., such as packet acknowledge, timeout, and retransmit tasks) may be built into interface/interconnection hardware present in a data communication link between ASICs or other devices. Using the configuration of the above-described embodiment, a ASIC array may be configured so as to be easily scaleable to other cards, e.g., permitting expansion of ASIC resources. Where described herein in relation to a FPGA array, it will be understood that the disclosed systems and methods may be implemented with an array of any other type of ASIC device or an array of a combination of types such devices.

In one respect, disclosed herein is signal processing circuitry including three or more ASIC devices coupled together by one or more serial data communication links so that any given one of the three or more ASIC devices may communicate with any given other one of the three or more ASIC devices through at least one serial data communication link that includes no more than two serial connections.

In another respect, disclosed herein is a method of processing signals using three or more ASIC devices, the method including communicating signals from each of the three or more ASIC devices to each other one of the three or more ASIC devices through at least one data serial communication link that includes no more than two serial connections.

In another respect, disclosed herein is an ASIC array, including: three or more ASIC devices, each of the ASIC devices having at least a first serial connection and a second serial connection; wherein a first serial connection of a first one of the three or more ASIC devices is coupled to a first serial connection of a second one of the ASIC devices with no other serial connection therebetween to form a first serial data communication link; wherein a second serial connection of the first one of the three or more ASIC devices is coupled to a first serial connection of a third one of the three or more other ASIC devices with no other serial connection therebetween to form a second serial data communication link; and wherein a second serial connection of the second one of the three or more ASIC devices is coupled to a second serial connection of the third one of the three or more ASIC devices with no other serial connection therebetween to form a third serial data communication link.

In another respect, disclosed herein is signal processing circuitry including three or more ASIC devices, each one of the three or more ASIC devices including a packet router, the packet router of each one of the three or more ASIC devices being coupled to each respective packet router of the other three or more ASIC devices by a separate respective duplex data communication link so as to form a direct serial interconnection between each two of the three or more ASIC devices.

In another respect, disclosed herein is a method of routing data packets between three or more ASIC devices of an ASIC array that each include a first serial connection and a second serial connection, the method including: transferring at least one data packet across a first serial data communication link formed between a first serial connection of a first one of the three or more ASIC devices and a first serial connection of a second one of the three or more ASIC devices with no other serial connection therebetween; transferring at least one data packet across a second serial data communication link formed between a second serial connection of the first one of the three or more ASIC devices and a first serial connection of a third one of the three or more other ASIC devices with no other serial connection therebetween; and transferring at least one data packet across a third serial data communication link formed between a second serial connection of the second one of the three or more ASIC devices and a second serial connection of the third one of the three or more ASIC devices with no other serial connection therebetween.

In another respect, disclosed herein is a method of processing signals using signal processing circuitry including three or more ASIC devices, each one of the three or more ASIC devices including a packet router, and the method including transferring at least one data packet from each the packet router of each one of the three or more ASIC devices to each respective packet router of the other three or more ASIC devices by a separate respective duplex data communication link that forms a direct serial interconnection between each two of the three or more ASIC devices.

BRIEF DESCRIPTION OF THE DRAWINGS

FIG. 6 illustrates a data packet header according to one exemplary embodiment of the disclosed systems and methods.

DESCRIPTION OF ILLUSTRATIVE EMBODIMENTS

Figure 1:
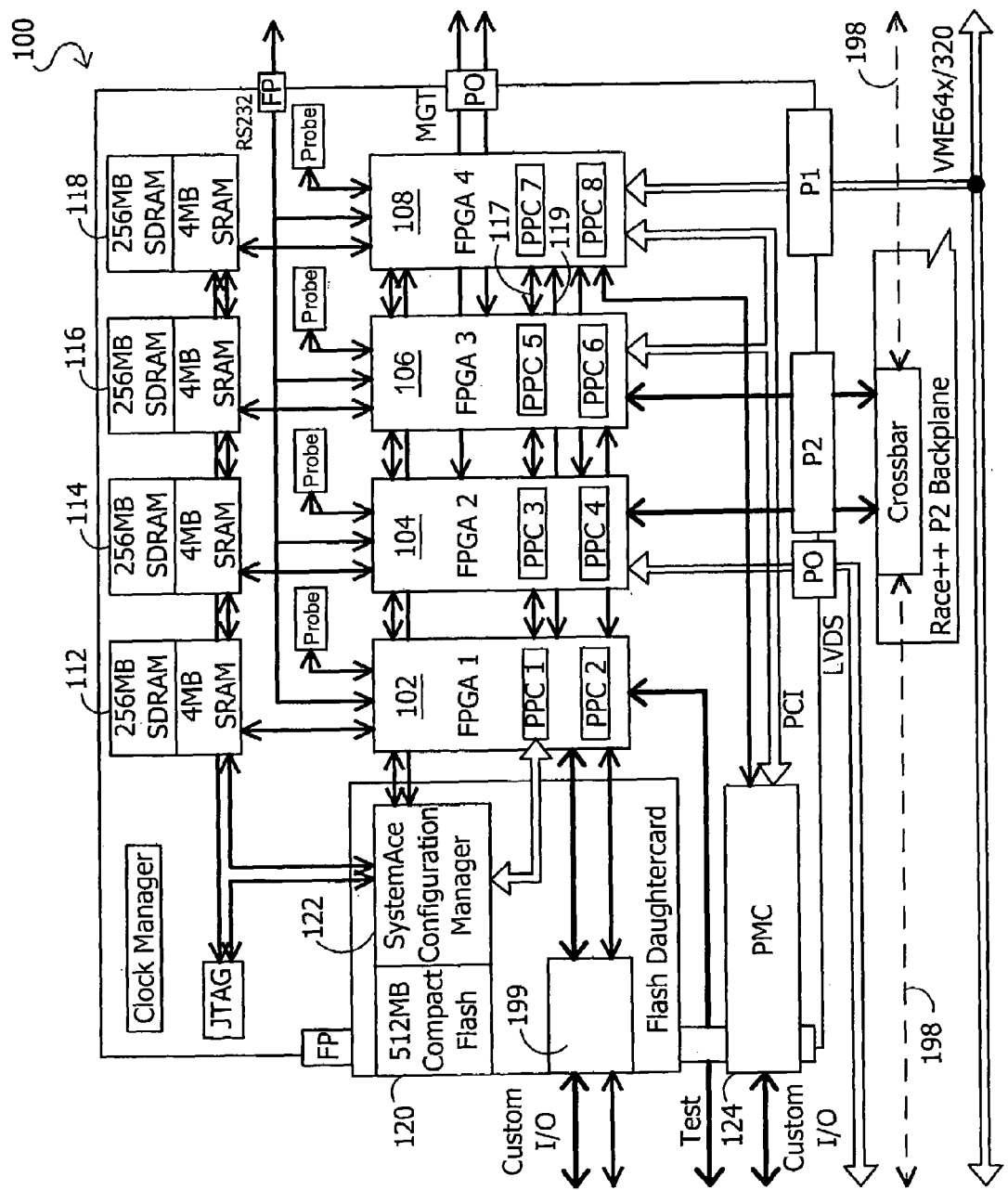
FIG. 1 illustrates a reconfigurable signal processing circuit according to one exemplary embodiment of the disclosed systems and methods.

FIG. 1 illustrates a reconfigurable signal processing circuit 100 as it may be configured on a single circuit card for reconfigurable signal processing and I/O applications according to one exemplary embodiment of the disclosed systems and methods. As shown in FIG. 1, multiple ASIC devices may be provided on a single circuit card, in this exemplary embodiment in the form of four FPGA devices 102, 104, 106 and 108. As will be described further herein, a packet router interface switch matrix ("PRISM") may be provided to route packets between FPGA devices 102, 104, 106 and 108, and other card-level and off-card devices and interfaces in a manner as will be described further herein. As illustrated in the figures herein, arrowhead notation is provided to indicate signal communication with a particular component. In this regard, an arrowhead that intersects a given device or component indicates signal communication to that given component in the direction indicated, while a line without an arrow head indicates that the line passes behind that component, i.e., without signal communication to the component. For example, in FIG. 1, duplex serial data communication link 117 is provided between FPGA devices 106 and 108, and duplex serial data communication link 119 is provided between FPGA devices 102 and 108.

In one exemplary embodiment, each of FPGA devices 102, 104, 106 and 108 may be a Xilinx Virtex-II Pro® XC2VP50 FPGA device (available from Xilinx, Inc. of San Jose, Calif.), and FPGA devices 102, 104, 106 and 108 may be interconnected via high speed serial I/O connections in the form of multiple MGTs that may be interconnected to form data communication links. In this regard, each XC2VP50 FPGA device features a massive programmable logic array, including over 50,000 flip-flops and their associated combinational logic. Additional embedded functions of Xilinx Virtex-II Pro® XC2VP50 FPGA devices include two PowerPC® ("PPC") 405 cores, 232 18×18 multipliers, 4.2 Mb of RAM, 852 user-defined I/O pins, 16 MGTs, and digital clock management.

When implemented with four Xilinx Virtex-II Pro® XC2VP50 FPGA devices, signal processing circuit 100 of FIG. 1 may be configured in one embodiment to accommodate board-level designs in the 15 to 20 million-gate range. However, although the signal processing circuit of FIG. 1 is described and illustrated with respect to one particular type of FPGA device, it will be understood that the disclosed systems and methods may be implemented with any other number and/or type/s of multiple ASIC devices that are suitable for card-level interconnection using serial I/O connections. Specific examples of other types of suitable ASIC devices include, but are not limited to, other Virtex-II Pro® devices, Altera Stratix GX® devices, other large FPGAs with high-speed serial I/O, custom ASIC devices with high-speed serial I/O, hardware modules using discrete high-speed serial I/O, etc. Further exemplary information on the use of MGT connections on PLD devices as may be employed in the practice of the disclosed systems and methods may be found in U.S. Pat. No. 6,617,877, which is incorporated herein by reference.

Still referring to FIG. 1, each FPGA device 102, 104, 106 and 108 may be configured to have access to respective dedicated memory resources 112, 114, 116 and 118 that may each include, for example, 256 MB of 266 MHz DDR SDRAM and 4 MB of 100 MHz ZBT SRAM. As illustrated, a Compact Flash ("CF") module 120 may be provided for use as non-volatile storage of FPGA configuration data and software. In this regard, a 512 MB CF device may be configured in one exemplary embodiment to store up to 45 configurations for the four-FPGA array of FIG. 1, and an automated reconfiguration manager 122 (e.g., Xilinx System Ace®) may be provided to support JTAG communications between the multiple FPGAs and full reconfiguration of the four-FPGA array, e.g., in under 5 seconds. In one exemplary embodiment, the illustrated signal processing circuit embodiment of FIG. 1 may be configured to offer a variety of standard interfaces, e.g., including VME64x, PCI, RACE++, parallel Rapid I/O, and high-speed serial standards based on MGTs. In this regard, MGT-based interfaces may include, for example, Fibrechannel, Serial Rapid I/O, XAUI (gigabit Ethernet), Infiniband, and Aurora. The exemplary signal processing circuit 100 of FIG. 1 may be provided with at least one PCI Mezzanine Card ("PMC") interface site 124 and/or other type/s of custom interface site/s (not shown) to interface with a wide variety of commercial off-the-shelf ("COTS") devices such as analog/digital converters ("A/Ds"), high-speed I/O, and auxiliary processors/memory (e.g., RAM).

Also illustrated in the exemplary embodiment of FIG. 1 are VME card connector plug jacks (P0, P1, P2), front panel ("FP") connections, RACE interlink 198, and optional parallel I/O paths that may be provided for connection to analyzer probes for test purposes. A custom front panel interface may be provided using any suitable I/O methodology (e.g., MGT serial connection/s, etc.). It will be understood that the foregoing components and features are exemplary only, and that any one or more of these components and/or features may be omitted, or that additional components and/or features may be present as so desired or needed to meet the requirements of a given application.

Figure 2:
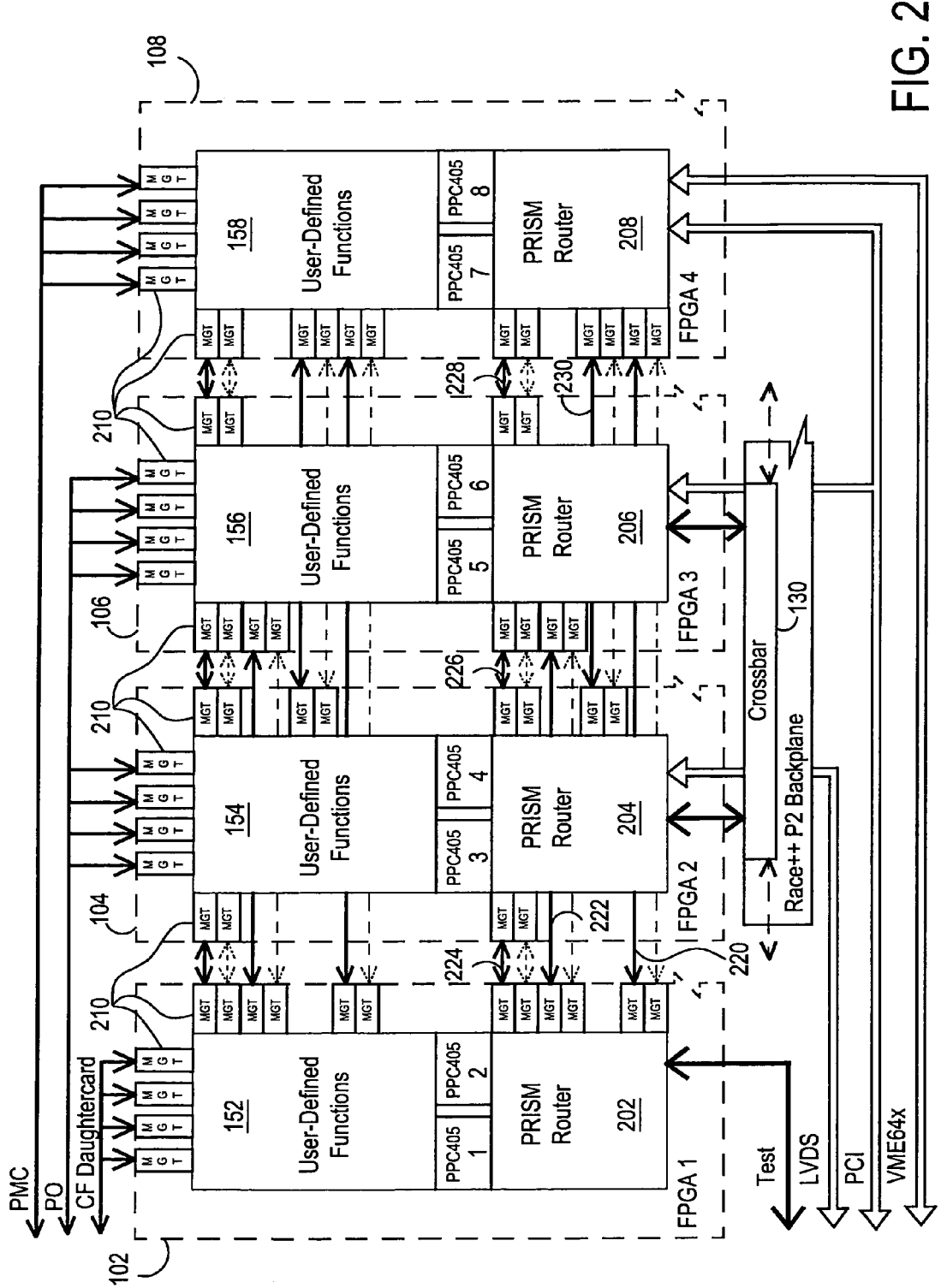
FIG. 2 illustrates a packet router interface switch matrix ("PRISM") communications infrastructure according to one exemplary embodiment of the disclosed systems and methods.

FIG. 2 illustrates one exemplary embodiment of a packet router interface switch matrix ("PRISM") communications infrastructure formed as a part of the RHA of reconfigurable signal processing circuitry 100 of FIG. 1, and as it may be implemented to interconnect multiple FPGAs 102, 104, 106 and 108 of the reconfigurable signal processing circuitry 100 of FIG. 1. As further illustrated in FIG. 2, in the PRISM infrastructure each FPGA 102, 104, 106 and 108 may be configured with a respective high-bandwidth crossbar router that operates at or near the data transfer bandwidth of the associated high speed interfaces (e.g., about 240 Mbytes/sec or faster. In this regard, each of crossbar routers 202, 204, 206 and 208 may be provided for intra-FPGA communications, and may be provided with MGT connection cores 210 for inter-FPGA communications and communications with other devices.

As implemented in the exemplary embodiment of FIG. 2, the PRISM infrastructure may be configured to interconnect many of (or all) card-level interfaces, processor nodes, and/or user functions related to circuitry 100. In this regard, the PRISM infrastructure may be implemented to provide a useful basic communications framework that promotes commonality across many (or all) applications with little or no restriction to user utility. Further, the PRISM infrastructure may be implemented in a manner that does not preclude the addition of high-performance user connectivity, as it may be implemented to only use a portion of the available MGT and FPGA gate resources.

Figure 3:
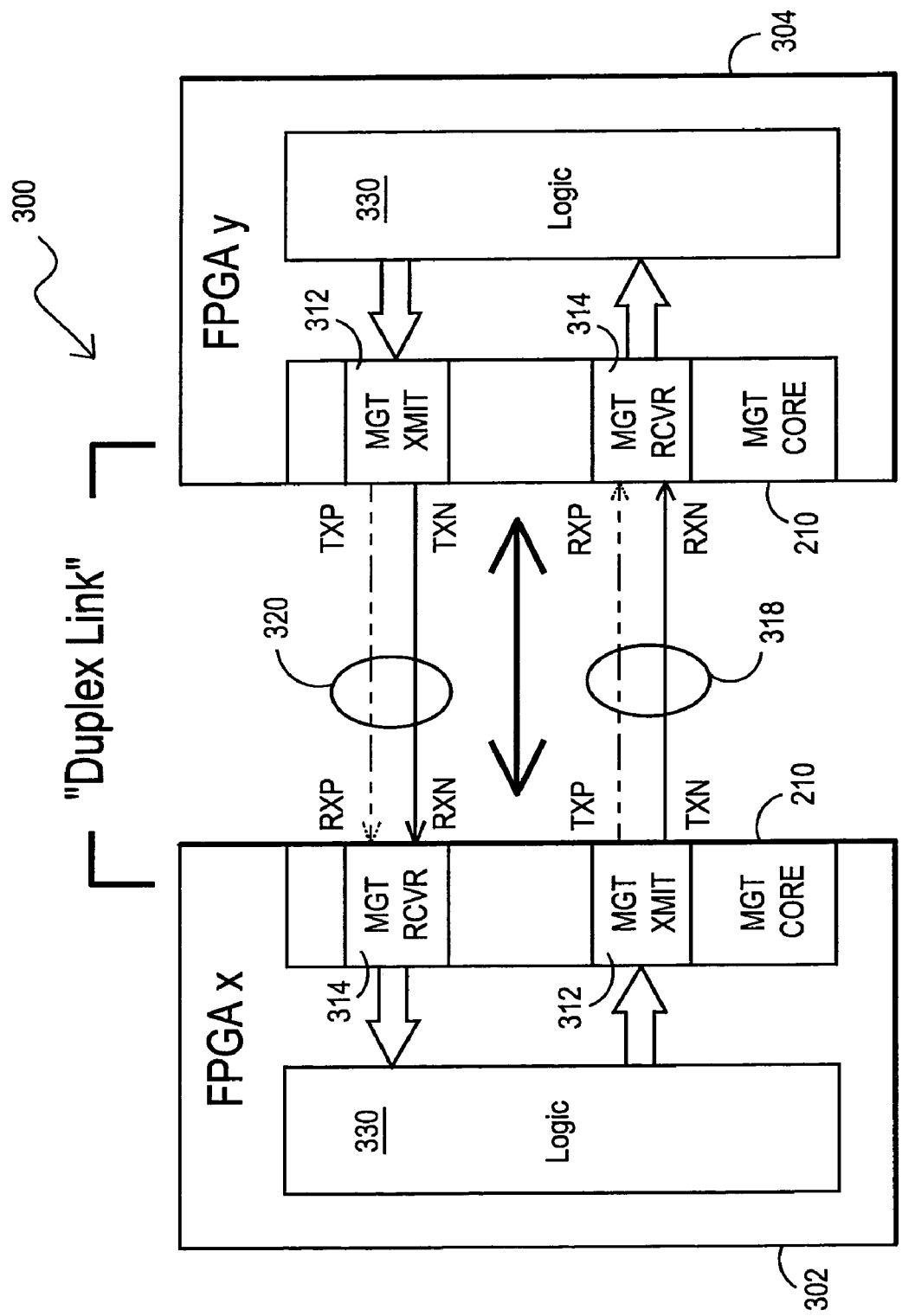
FIG. 3 illustrates a duplex data communication link according to one exemplary embodiment of the disclosed systems and methods.

Still referring to the exemplary embodiment of FIG. 2, a PRISM infrastructure may be implemented in the framework code of each FPGA 102, 104, 106 and 108 in a manner that interconnects many (or all) card-level interfaces, processors, and user-defined functions of signal processing circuitry 100 via MGTs 210 and high-bandwidth packet routers 202, 204, 206 and 208. In this regard, packets may be transferred between PRISM ports in point-to-point fashion, and PRISM hardware may be configured to handle all the details of transmission, including arbitration of packet transfers with the same destination. In this regard, FIG. 3 illustrates one exemplary embodiment of a duplex data communication link 300 formed between a given pair of FPGAs 302 and 304 to provide communication between FPGAs 302 and 304 in one embodiment of a PRISM infrastructure matrix. As illustrated, communication between FPGAs 302 and 304 may be accomplished between two full-duplex MGT connection cores 210 (each including respective MGT transmitter 312 and MGT receiver 314) that form duplex data communication link 300. As illustrated in FIG. 3, MGTs 210 may be coupled to logic circuit 330 of respective FPGAs 302 and 304, and may be configured in this embodiment such that communication between FPGAs 302 and 304 is in the form of differential serial signals 318 and 320. It will be understood that two ASIC devices may be interconnected by more than one duplex data communication link (e.g., using two or more pairs of MGT cores 210), and that non-duplex or any other suitable type of communication link/s may be employed in other embodiments to interconnect multiple ASIC devices.

As shown by the double-arrowhead lines in FIG. 2, a packet router interface switch matrix ("PRISM") communications infrastructure may be configured so that one or more direct duplex data communication links exists between any given two ASIC devices, and in this exemplary embodiment between any two FPGAs of multiple FPGAs 102, 104, 106 and 108. For example, duplex data communication link 220 is shown provided between one MGT 210 of PRISM router 202 of FPGA 102 and one MGT 210 of PRISM router 208 of FPGA 108; duplex data communication link 222 is shown provided between one MGT 210 of PRISM router 202 of FPGA 102 and one MGT 210 of PRISM router 206 of FPGA 106; duplex data communication link 224 is shown provided between one MGT 210 of PRISM router 202 of FPGA 102 and one MGT 210 of PRISM router 204 of FPGA 104; duplex data communication link 226 is shown provided between one MGT 210 of PRISM router 204 of FPGA 104 and one MGT 210 of PRISM router 206 of FPGA 106; duplex data communication link 228 is shown provided between one MGT 210 of PRISM router 206 of FPGA 106 and one MGT 210 of PRISM router 208 of FPGA 108; and duplex data communication link 230 is shown provided between one MGT 210 of PRISM router 204 of FPGA 104 and one MGT 210 of PRISM router 208 of FPGA 108. One or more additional duplex data communication links may be optionally provided between respective MGTs 210 of two or more (e.g., between all) of the multiple FPGAs 102, 104, 106 and 108, as shown by the additional dotted and solid double-arrowhead lines in FIG. 2.

As further shown in FIG. 2, FPGAs 102, 104, 106 and 108 may be provided with MGTs 210 that form at least one duplex serial link between the User-Defined Functions (152, 154, 156, 158) of each FPGA pair, as well as MGTs 210 that form at least one duplex serial link between the PRISM routers (202, 204, 206, 208) of each FPGA pair, although it will be understood that it is not necessary for a given application that duplex serial links be provided between FPGA User-Defined Functions of given pair/s of FPGAs. Rather, the disclosed systems and methods may be implemented in one alternative embodiment by providing as few as one serial link (e.g., duplex serial link) between pairs of FPGA PRISM routers. It is also possible that one or more data communication link/s (e.g., duplex data communication links) may be provided between FPGA User-Defined Functions of a given pair/s of FPGAs (but not between FPGA PRISM routers), while at the same time one or more duplex data communication link/s may be provided between FPGA PRISM routers (but not FPGA User-Defined Functions) of another given pair/s of FPGAs. Thus, it will be understood that in the practice of the disclosed systems and methods that any FPGA function or embedded module/device on a given FPGA (or other type ASIC) may be linked to any FPGA function or embedded module/device (of the same or different type) on another FPGA (or other ASIC) using one or more serial data communication link/s (e.g., high speed I/O serial data communication links).

Figure 4:
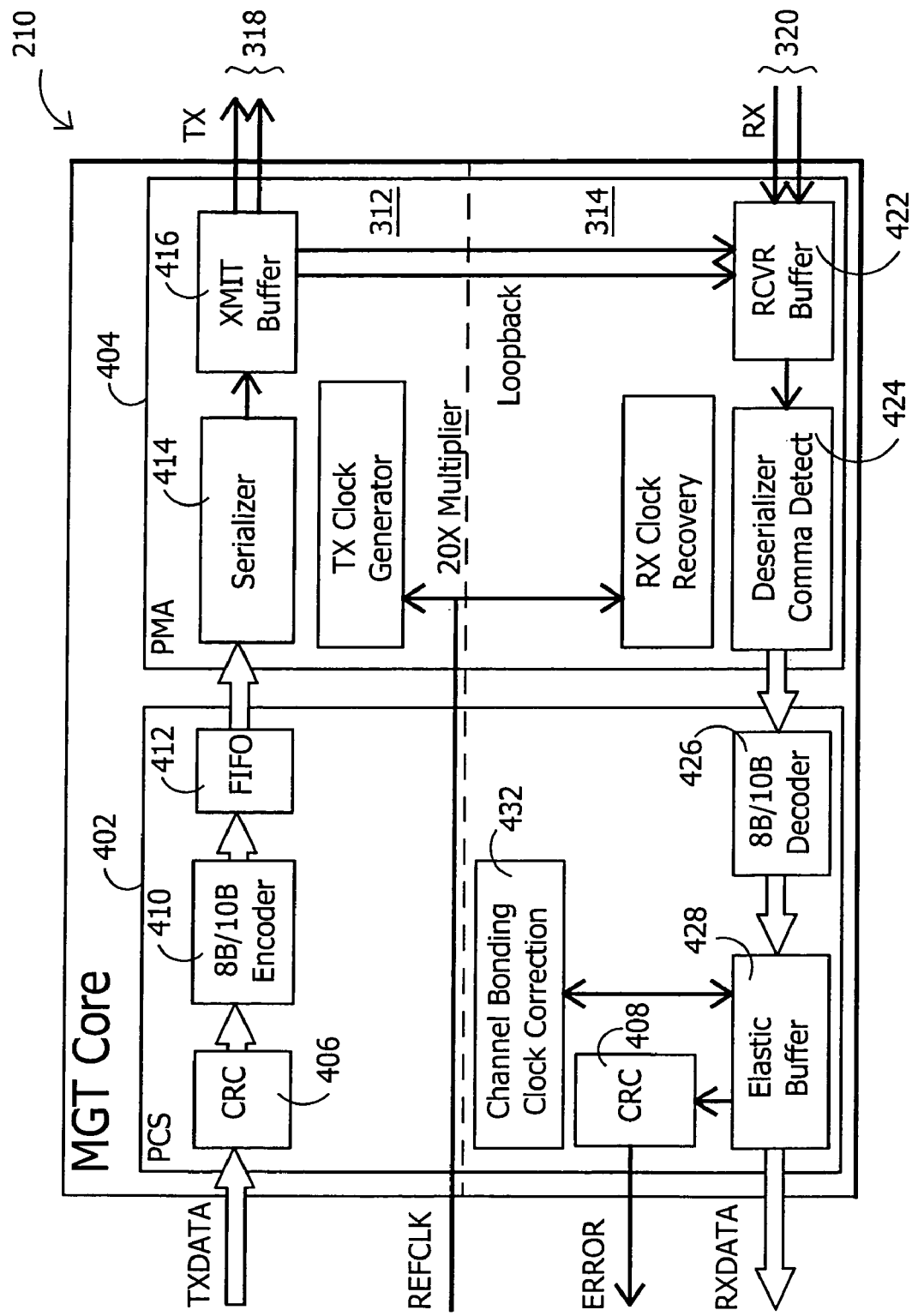
FIG. 4 illustrates a MGT connection core according to one exemplary embodiment of the disclosed systems and methods.

FIG. 4 illustrates a serial I/O connection core, in this illustrated exemplary embodiment a MGT connection core 210 (e.g., a Xilinx Virtex-II Pro® MGT connection core), as it may be employed in one exemplary embodiment of the disclosed systems and methods. As illustrated, a MGT connection core 210 may be configured to include transmitter circuitry 312 and receiver circuitry 314. Sixteen such MGT cores 210 are provided in each. Xilinx Virtex-II Pro® XC2VP50 FPGA device employed in the illustrated embodiment, although it will be understood that other types of ASIC devices and/or ASIC devices having a different number of serial connections (e.g., MGT connections or other suitable type/s of serial connections) may be employed in the practice of other embodiments of the disclosed systems and methods.

As shown in the illustrated embodiment of FIG. 4, a Xilinx Virtex-II Pro® MGT core 210 may be employed that is configured with respective circuitry 402 and 404 to provide the Physical Coding Sublayer ("PCS") and Physical Media Attachment ("PMA") layers of the Open Systems Interconnection ("OSI") networking model. Such an exemplary MGT connection core 210 may support data transmission rates between 622 Mbps and 3.125 Gbps, and channel bonding between multiple transceivers may also be supported. Multiple clock inputs may be provided to allow for multi-rate operation, e.g., when requirements for low-jitter clocking preclude the use of programmable clocks.

Still referring to the exemplary Xilinx Virtex-II Pro® MGT core 210 of the embodiment of FIG. 4, a MGT transmitter 312 of core 210 may accept input word widths of 8, 16, or 32 bits. When a PRISM infrastructure is configured using such Xilinx MGT cores 210, the infrastructure may be configured in one embodiment so that MGT's 210 use a 32-bit input mode, although any other suitable input mode may be employed in other embodiments. In one exemplary embodiment, commas, clock correction sequences, and packet boundaries may be established via user-defined "K" characters, and a MGT transmitter 312 may include circuitry 406 to replace the last word of the packet with a Cyclical Redundancy Checking ("CRC") word that is used to verify packet integrity in circuitry 408 of MGT receiver 314. An 8 B/10 B encoder 410 may be used to translate input bytes into 10-bit words prior to serialization, e.g., ensuring no more than 5 consecutive ones or zeros in the resulting serial bit stream. A small FIFO 412 may be provided at the encoder output as an elastic buffer. As shown, MGT transmitter 312 may also be provided with serializer 414 and transmit buffer 416. The final bit stream may be sent as low voltage differential signal ("LVDS") 418, and impedance and pre-emphasis controls may be provided.

As illustrated, a MGT Receiver 314 may be configured with a receive buffer 422 to accept a LVDS bit stream 420, using an analog phase locked loop ("PLL") to recover the clock and data. A comma detect scheme may be employed to achieve byte alignment on the serial bit stream prior to deserialization in circuitry 424. An 8 B/10 B decoder 426 may be used to return the original byte values. Manipulation of pointers in an elastic buffer 428 may be used to support clock correction and channel bonding in circuitry 432. The embedded CRC word in each packet may be checked in circuitry 408 after an end-of-packet K-character ("EOP K-Character") is detected.

It will be understood with benefit this disclosure that FIG. 4 illustrates just one exemplary embodiment of serial I/O connection (i.e., a Xilinx Virtex-II Pro® MGT core) having particular signal handling features as described above that may be employed in a PRISM infrastructure of the disclosed systems and methods. In this regard, it will be understood that any other type of serial I/O connection or serial I/O connection (e.g., having fewer, different and/or additional signal handling features) that is suitable for serial digital signaling may be employed in other embodiments for implementing a PRISM infrastructure. Such serial digital signaling includes, but is not limited to, duplex serial digital signaling at byte transfer rates higher than the associated parallel interfaces. Examples of other suitable serial I/O connections include, but are not limited to, RS-232, AMD TAXI®, Hewlett-Packard G-Link, Fibrechannel FC-0, embedded microprocessor serial interfaces such as Texas Instruments' TMS320C30 serial links, various high-speed serial optical links, etc.

Figure 5:
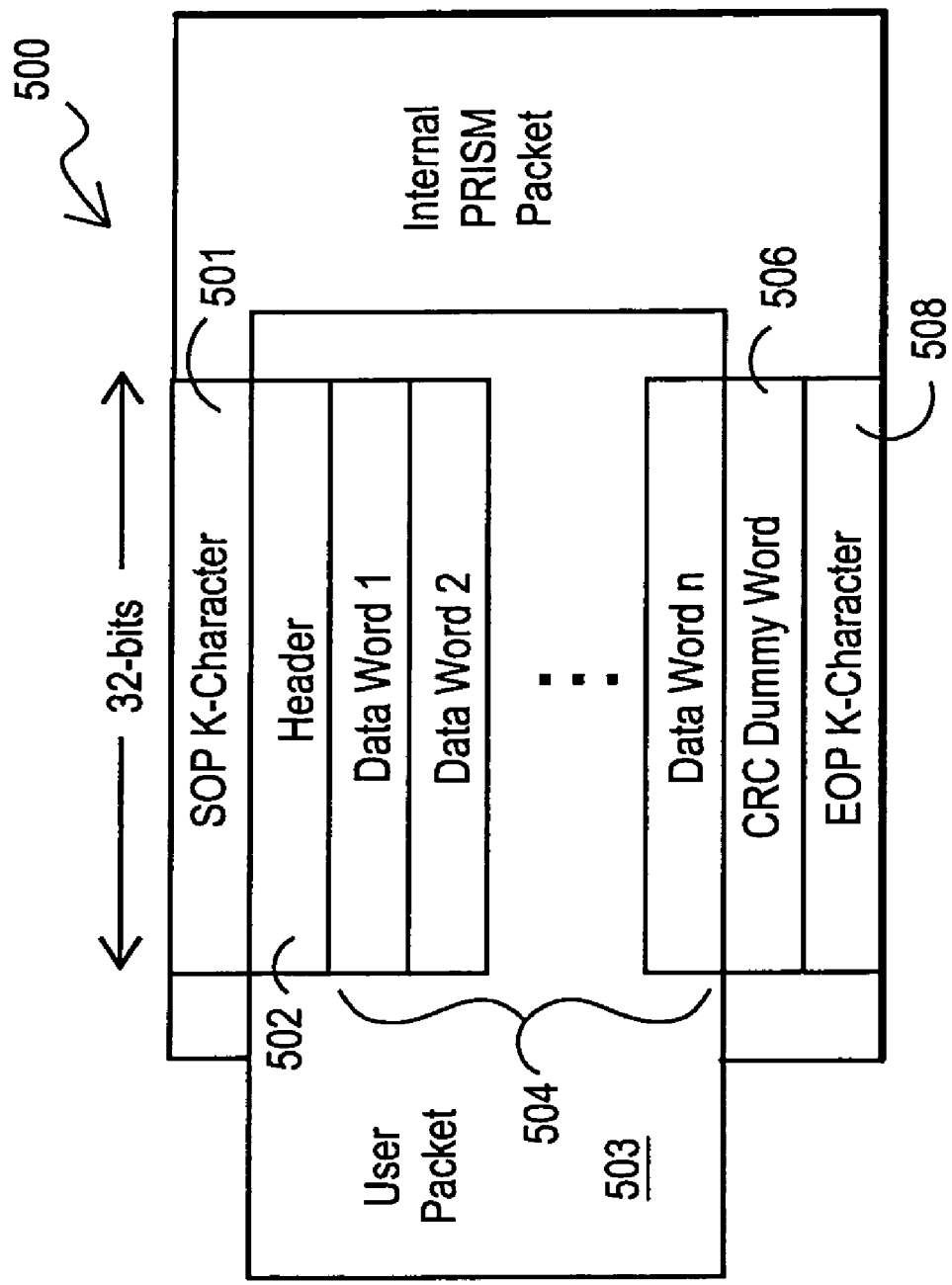
FIG. 5 illustrates a data packet according to one exemplary embodiment of the disclosed systems and methods.

FIG. 5 illustrates one exemplary embodiment of data packet 500 that may be employed for communication in a PRISM infrastructure. In such an embodiment, a PRISM router (e.g., 202, 204, 206, 208 of FIG. 2) may be configured to transfer data words from a source to a destination in the form of packets. As illustrated in FIG. 5, following the start-of-packet K-character ("SOP K-Character") 501 each PRISM packet may contain a user packet 503 that includes a header 502 and a data payload 504 organized into a series of 32-bit words. Also illustrated are CRC word 506 that may be present before the EOP K-Character 508 to verify packet integrity at the receiver in a manner as previously described. In one embodiment, PRISM packets 500 may range in length from 4 to 511 words.

FIG. 6 illustrates one exemplary embodiment of PRISM data packet header 600. As shown, packet header 600 may contain a routing code that allows the sender to determine the packet's destination within a PRISM infrastructure or matrix. In such an embodiment, packet wrappers, control characters, and associated packet retransmit protocols used in the inter-FPGA duplex data communication links 300 may be invisible to the user, and flow control protocols may be used to ensure that only one packet at a time is present in any of the point-to-point links.

It will be understood with benefit of this disclosure that FIGS. 5 and 6 illustrate just one exemplary embodiment of the PRISM packet and PRISM packet header that may be employed in the practice of the disclosed systems and methods. In this regard, examples of other suitable data packet configurations that may be employed in a PRISM infrastructure include, but are not limited to, TCP/IP, Fibrechannel, XAUI, Ethernet, Infiniband, Rapid I/O, etc.

Figure 7:
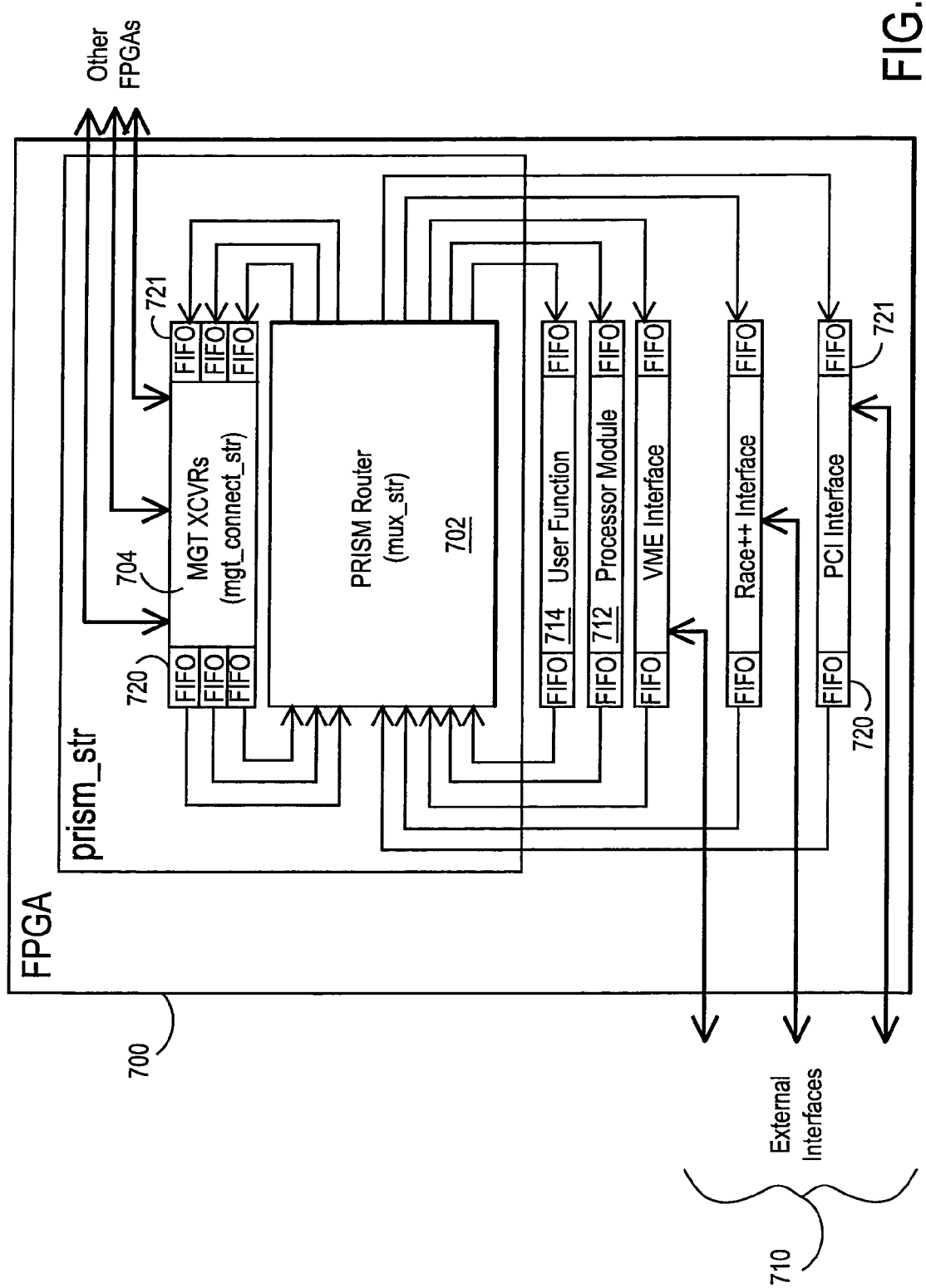
FIG. 7 illustrates a FPGA device that includes a PRISM router according to one exemplary embodiment of the disclosed systems and methods.
Figure 8:
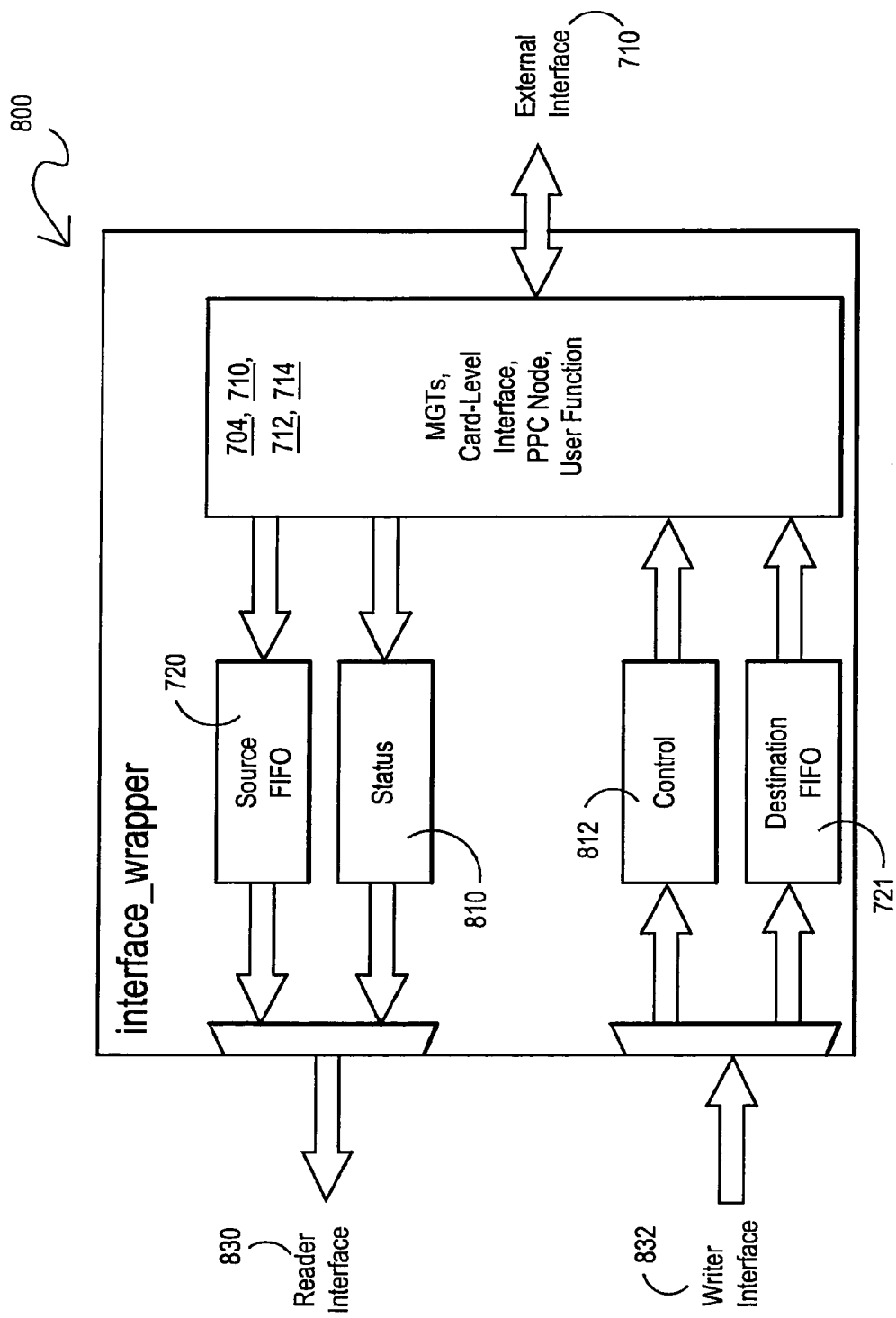
FIG. 8 illustrates a PRISM router interface wrapper according to one exemplary embodiment of the disclosed systems and methods.

FIG. 7 illustrates one exemplary embodiment of a PRISM router configuration 702 that may be used to transfer data packets within a PRISM infrastructure to interconnect multiple ASIC devices, e.g., to interconnect multiple FPGAs 102, 104, 106 and 108 of the reconfigurable signal processing circuitry 100 of FIG. 1. As shown in FIG. 7, each ASIC device (e.g., FPGA 700 of an FPGA array or other configuration of multiple ASIC devices) may be configured to include a PRISM router 702 that interconnects its card-level interface/s 710, processor/s 712, user function/s 714, and inter-FPGA MGTs 704. As shown for the exemplary embodiment of FIG. 7, PRISM router 702 may be configured to connect to MGTs 704, card-level interface/s 710, processor/s 712, and/or user-defined function/s 714 via source FIFO interfaces 720 and destination FIFO interfaces 721, and so that all PRISM interface ports share a similar structure as illustrated by PRISM router interface wrapper 800 of FIG. 8. In this regard, PRISM router 702 may be configured to see read and write interface ports 830 and 832 (e.g., router interface ports with MGTs 704, card-level interface/s 710, processor/s 712, user-defined function/s 714, etc.) as packet sources and destinations. In such an embodiment, interface modules may have source and destination FIFOs 720 and 721 mapped as slave functions, and users may read/write PRISM packets via these slave interfaces.

The disclosed systems and methods may be implemented using a PRISM communications infrastructure to distribute command/control packets in a manner that supports tasks such as reporting of status and command functions. For example, referring to the exemplary embodiment of FIG. 8, a datapath configuration scheme may be implemented via the PRISM matrix using status interface 810 and control interface 812. In this regard, control interface 812 may be provided to intercept control register packets (e.g., command packets provided by a user) that may be used for controlling PRISM matrix operations and/or user defined function operations. Similarly, status interface 810 may be provided to read status register packets transferred via the PRISM matrix. Advantageously, such a datapath configuration scheme may be implemented to achieve simplified operation and circuit layout, e.g., as compared to implementation of control and status tasks using host control register bus, or daisy chain topology.

In one embodiment of the disclosed systems and methods, a PRISM routing scheme may be configured so that each pair of FPGAs on a given circuit card share a duplex data communication link, and so that no matter what its source is, a packet will cross no more than one duplex data communication link to reach any destination in the PRISM matrix. In this regard, a packet may be routed from a given source to a given destination using any methodology suitable for reading packets from a given PRISM router input or "reader" interface (e.g., from a source FIFO attached to a PRISM router input interface as illustrated in FIG. 7), and for writing the packets to a given PRISM router output or "writer" interface (e.g., to a destination FIFO attached to a PRISM router output interface). Thus, in one embodiment, a "reader interface" may be characterized as an interface used to read packets from a FIFO attached to a PRISM router input, and a "writer interface" may be characterized as an interface used to write packets to a FIFO attached to a PRISM router output. However, it will be understood that any other type of packet transmission (e.g., packet queuing and/or arbitration) techniques other than FIFO may be employed that is suitable for reading packets from a PRISM router input and/or writing packets to a PRISM router output. Examples of such alternative techniques include, but are not limited to, Dual-Port RAM, microprocessor-controlled RAM buffers, register banks, etc.

It will be understood that a PRISM routing scheme may be optionally configured with additional routing capability. For example, when insufficient bandwidth is provided by all available direct duplex data communication links between two devices (e.g., between source and destination FPGA devices), additional bandwidth may be obtained by relaying all or a portion of packets through more than one duplex data communication link (e.g., by relaying packets from a source FPGA to a intermediate second FPGA and then to the destination FPGA through the PRISM router/s of one or more other FPGAs). When implemented, such routing decisions may be made manually by the user or automatically by the PRISM router.

Figure 9:
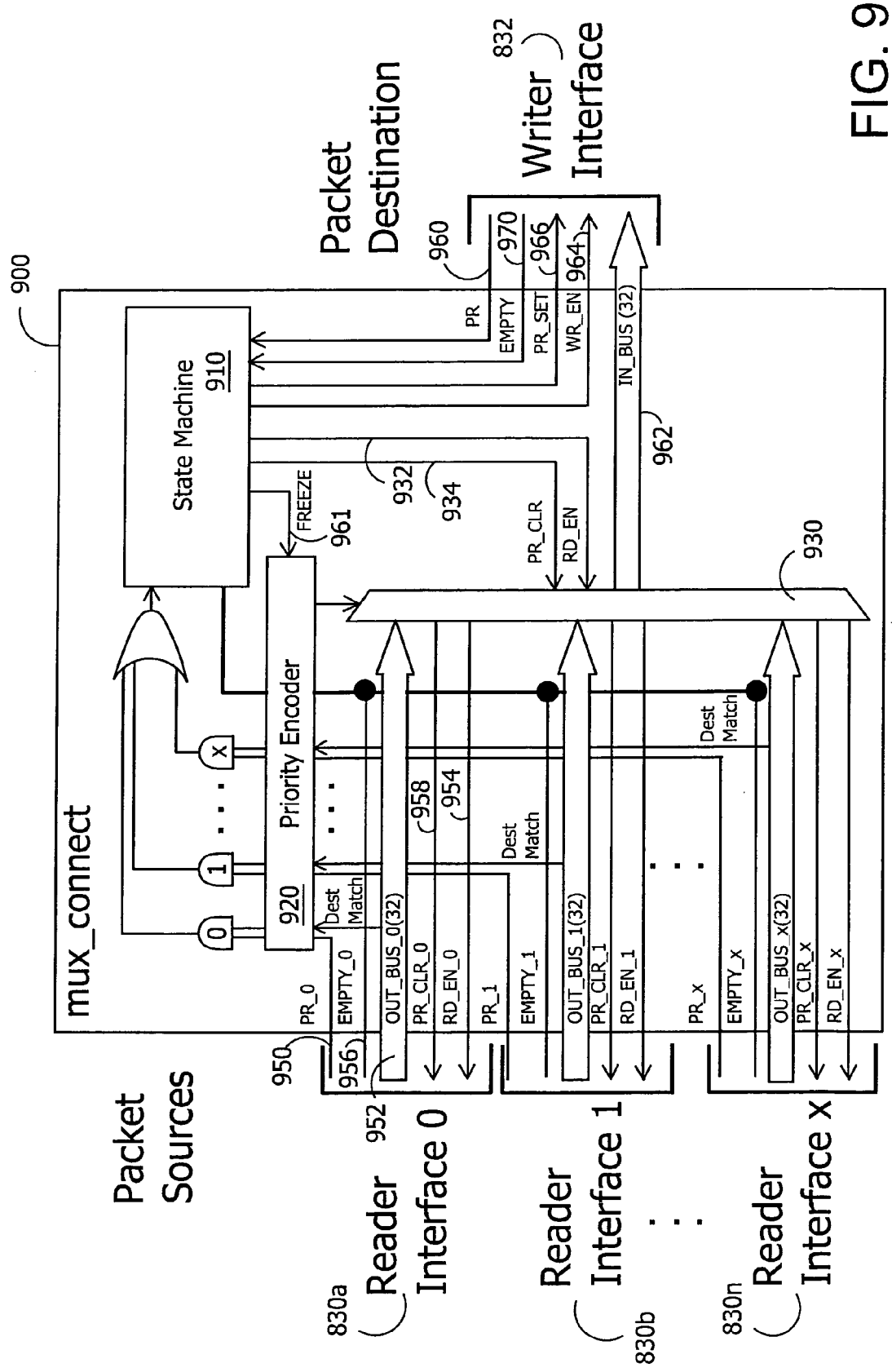
FIG. 9 illustrates a PRISM router connect multiplexer according to one exemplary embodiment of the disclosed systems and methods.

As illustrated in the exemplary embodiment of FIG. 9, each packet destination or writer interface 832 of PRISM router 702 may be configured with a connect multiplexer ("mux_connect") 900 that is capable of accessing each available PRISM reader interface 830*a* to 830*n* (e.g., each reader interface available in the local FPGA or other local ASIC device). Within a PRISM router 702 there may be multiple such packet destinations or writer interfaces 832 with a respective connect multiplexer 900 assigned to each corresponding packet destination. Using such an exemplary configuration, a packet transfer request may be asserted at a given reader interface 830 of the PRISM router 702 in combination with packet destination information that corresponds to the connect multiplexer 900 of the desired packet destination or writer interface 832.

As illustrated for the exemplary embodiment of FIG. 6, packet destination information may include, for example, both an FPGA destination code and a "local" destination code within the destination FPGA. In one example, the packet destination information may be written so that either the FPGA destination code matches the code for the current FPGA, or in the event that it does not, so that a specific MGT destination interface is provided. Thus, if the FPGA destination code does not match the code for the current FPGA, then one of the MGT interfaces will match an available MGT and the packet will be routed off the FPGA to the specified MGT destination. Packets so routed and received at an MGT interface are assumed to be at their destination FPGA and are then routed based on the local destination. However, if the FPGA destination code matches the code for the current FPGA, then the local destination code may be used to determine where the packet goes. It will be understood that such a packet routing scheme may be implemented with other types of ASIC devices besides FPGA devices, and that other types of packet routing schemes are also possible.

Still referring to the exemplary embodiment of FIG. 9, a packet read sequence may begin with a packet source FIFO 720 of a given reader interface 830*a* asserting a "packet ready" (PR_0) indication 950 to connect multiplexer 900 of a PRISM router 702. At this time, the header word of the packet, presented at DATA input (OUT_BUS_0) 952 of router 702, is assumed to be valid. Assertion of PR_0 indication 950 enables router 702 to transfer the packet as soon as the indicated packet destination (writer interface) 832 is available. The packet is read from the source FIFO 720 one word at a time by asserting the "read enable" control (RD_EN_0) 954. When the entire packet is read from the FIFO 720, the empty indicator (EMPTY_0) 956 is asserted. Assertion of "packet ready clear" (PR_CLR_0) 958 will cause PR_0 950 to be de-asserted to both the source FIFO 720 and to multiplexer 900 of a PRISM router 702. Router 702 will then wait until the next packet is available.

A packet write sequence may begin with an inactive "packet ready" (PR) indication 960 from a FIFO 721 of the specified packet destination (writer interface) 832. This serves as a signal to multiplexer 900 of a PRISM router 702 that FIFO 721 of the specified packet destination (writer interface) 832 is ready to accept the next packet. When a packet is available for this destination, multiplexer 900 of a PRISM router 702 writes it at DATA output (IN_BUS) 962 of router 702 to FIFO 721 of packet destination 832 one word at a time by asserting the "write enable" control (WR_EN) indicator 964. Once the packet is written into the FIFO 721 of the specified packet destination 832, assertion of "packet ready set" (PR_SET) 966 will cause PR 960 to be asserted from FIFO 721. PR 960 is de-asserted by FIFO 721 when it is ready to accept the next packet. Empty indicator (EMPTY) 970 may be asserted by FIFO 721 to indicate that the entire packet has been written to another device from the FIFO 721 of packet destination 832.

As further shown in FIG. 9, connect multiplexer 900 may be configured with an optional state machine 910 to process requests for transfer of packets based on a specified priority scheme (e.g., on a "first-come, first-served" basis). In one exemplary implementation using a "first-come, first-served" priority scheme, simultaneous transfer requests may be arbitrated by state machine 910 based on priority assigned by the priority encoder 920 (e.g., the higher the bit significance in the destination field, the higher the priority). State machine 910 may assert "read enable" control (RD_EN) 932 to demultiplexer 930 in order to read the packet from the selected reader interface 830*a*-830*n*. Assertion of "packet ready clear" (PR_CLR) 934 by state machine 910 will cause the packet transfer process to terminate. After the priority determination has been made by the priority encoder 920, state machine 910 may be configured to assert a selector control to the demultiplexer 930 and then lock it in place ("FREEZE" 961) in order to select a reader interface 830*a-n* for packet transfer. Once a transfer path has been selected, a bit in the packet header may be used to "lock" the point-to-point path, preventing any other source from using the destination. It will be understood that the foregoing priority scheme is exemplary only, and that any other priority scheme (or combination of priority schemes) may be employed that is suitable for processing multiple simultaneous requests for transfer of data packets based on one or more inherent and/or assigned criteria.

Figure 10:
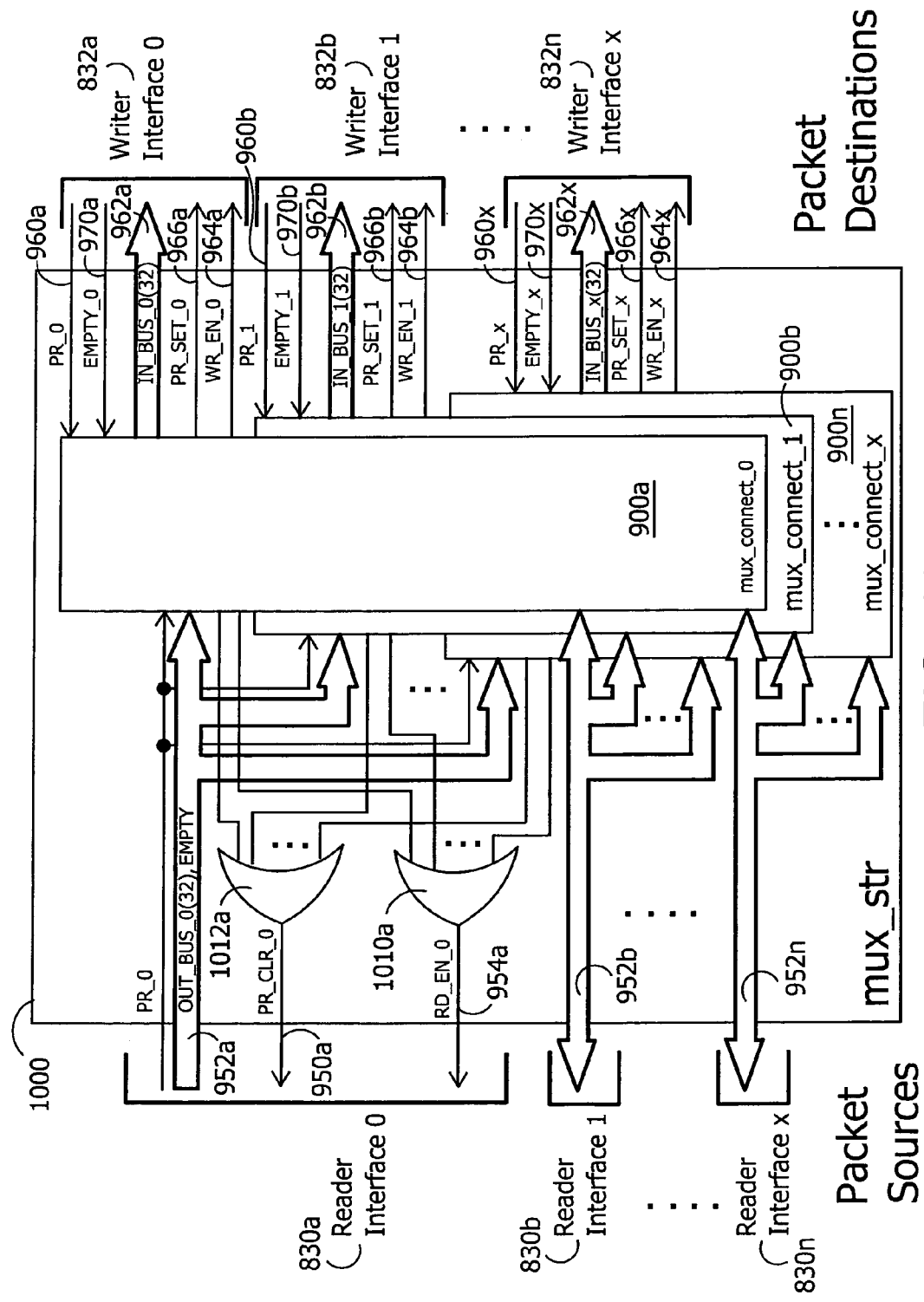
FIG. 10 illustrates a PRISM router matrix module according to one exemplary embodiment of the disclosed systems and methods.

FIG. 10 illustrates one exemplary embodiment of a PRISM router matrix module (mux_str) 1000 as may be implemented in the practice of the disclosed systems and methods. As shown in FIG. 10, an individual multiplexer connect module 900 (e.g., one of modules 900a to 900n) may be provided within matrix module 1000 for each individual PRISM writer interface 832a to 832n. As further illustrated, signals common to each reader interface 830a to 830n (e.g., such as RD_EN and PR_CLR signals) may be collected from each multiplexer connect module 900a to 900n and combined within matrix module 1000 (e.g., by signal combiners 1010 and 1012) for each PRISM reader interface 830a to 830n (only signal combiners 1010a and 1012a of PRISM reader interface 830a being illustrated in FIG. 10). To help assure portability, the same header word bit assignments may always be used for the same functions, regardless of which FPGA the router is instantiated into. In one embodiment, no one given FPGA uses all of the assigned bits at once and there is one pre-defined user, or "hardware" port. Thus, if more than one user port is required or desired for some reason, bits corresponding to an unused function in the given FPGA may be used for this purpose.

It will be understood that the embodiments illustrated herein are exemplary only, and that other configurations having fewer features, or having one or more alternative and/or additional optional features may be implemented in the practiced of the disclosed systems and methods. Examples of such optional features include, but are not limited to, multiple-destination broadcasts (e.g., implemented by either setting multiple destination bits in a packet header or by sending special command packets to create a "bucket-brigade" pathway within the PRISM matrix), multiple-FPGA relay modes (e.g., implemented by the use of multiple embedded headers and the header relay bit), and/or extension of an FPGA array to include two or more multiple circuit cards (e.g., implemented by the addition of additional MGT destination codes in the header which correspond to off-card MGT interfaces). Furthermore, in one exemplary embodiment, destination bits may be included in the routing field to support a "bypass" mode in the router that serves to facilitate relay of packets around more direct pathways which may be in use or may be non-functional. Furthermore, in another exemplary embodiment, bits may be included in the routing field to support a "debug" mode in the router that serves to facilitate tracing the source of packets. Furthermore, in another exemplary embodiment, bits may be included in the routing field to support a "command" mode in the router that serves to identify packets which carry command, control, and status information.

Figure 11:
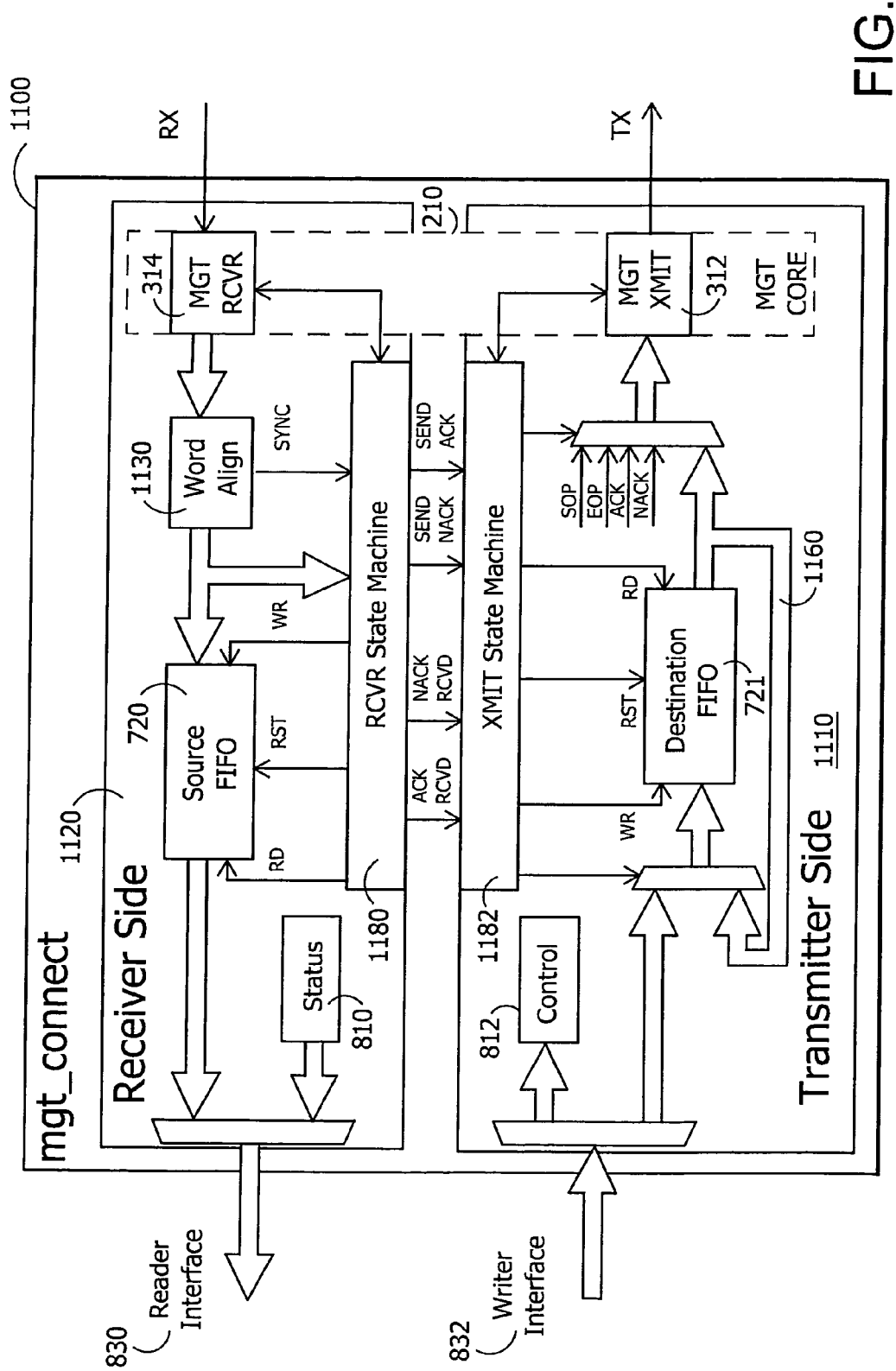
FIG. 11 illustrates a MGT connection module according to one exemplary embodiment of the disclosed systems and methods.

FIG. 11 illustrates one exemplary embodiment of a serial I/O connection module in the form of a MGT connection module (mgt_connect) 1100 as it may be implemented using a FPGA MGT core 210 in the practice of the disclosed systems and methods. When desired, MGT connection module 1100 may be provided to handle occasional bit errors that may be seen in high-speed serial links by providing automatic flow control tasks, e.g., such as packet acknowledge, timeout, and retransmit tasks. MGT connection module 1100 may also be configured to monitor a MGT duplex data communication link between two communicating MGTs for problems such as those related to PLL, byte, and word synchronization.

As illustrated in FIG. 11, transmitter side circuitry 1110 of MGT connection module 1100 may provide a destination FIFO 721 coupled to a PRISM router writer interface 832 that provides for input of packet traffic from a PRISM router 702 to the destination FIFO 721. In such an exemplary embodiment, host configuration of module 1100 may be supported via special configuration packets. Other packets may be written to destination FIFO 721 (e.g., a 512×32 FIFO) and sent out via MGT transmitter 312 of MGT core 210 as the data payload of an internal packet format. Packet flow control may be maintained via acknowledge/not-acknowledge (ACK/NACK) protocol. As illustrated loop-back path 1160 may be provided so that FIFO 721 may write a packet back to its own input until receipt thereof is acknowledged and the packet is discarded. Thus, in case a packet needs to be retransmitted due to a bit error, a copy may be kept in FIFO 721 until the packet acknowledge is received.

Still referring to FIG. 11, receiver side circuitry 1120 of MGT connection module 1100 may provide a source FIFO 720 coupled to a PRISM router reader interface 830 that provides for output of packet traffic to a PRISM router 702 from source FIFO 720. In such an exemplary configuration, packets may be received by MGT receiver 314 and placed into source FIFO 720 (e.g., a 512×32 FIFO) to be accessed from PRISM router reader interface 830. As shown, word alignment multiplexer 1130 may be provided to manage operation (e.g., 32-bit operation) with MGT core 210. Generation of host status, error monitoring, and packet flow control functions may also be performed in word alignment multiplexer 1130. Also illustrated in FIG. 11 are receiver state machine 1180, transmit state machine 1182 and received (RCVD) and send (SEND) acknowledge (ACK) and not-acknowledge (NACK) signals, as well as write (WR), reset (RST), read (RD) and synchronization (SYNC) signals.

Figure 12:
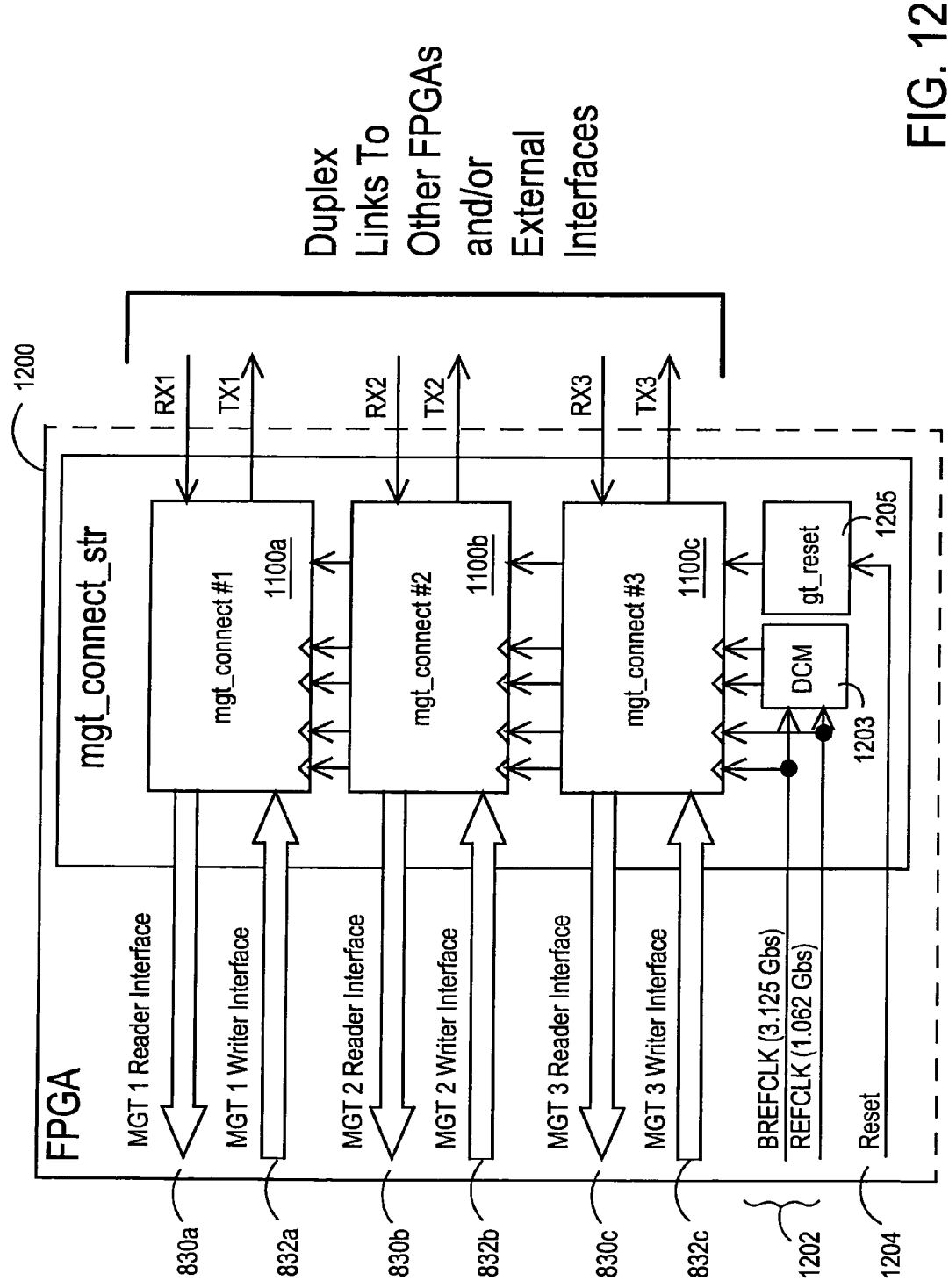
FIG. 12 illustrates a MGT connection wrapper according to one exemplary embodiment of the disclosed systems and methods.

In the practice of the disclosed systems and methods, two or more serial interface modules may be collected or otherwise assembled into one or more connection wrappers in order to consolidate/share common functions and/or tasks. For example, FIG. 12 illustrates one exemplary embodiment of a MGT connection wrapper (mgt_connect_str) 1200 that is configured with multiple MGT connection modules, in this case three MGT connection modules 1100a, 1100b and 1100c. It will be understood that MGT connection wrappers may be alternatively configured with two MGT connection modules or with more than three MGT connection modules in other embodiments. In the illustrated embodiment, the three multiple MGT connection modules 1100a-1100c are collected into common MGT connection wrapper 1200 in a manner so that they may share clock functions (1202, 1203) and reset functions (1204, 1205). In this regard, FIG. 12 shows digital clock manager (DCM) 1203 and serial connection (MGT) reset 1205.

It will be understood that the particular PRISM router configuration described herein in relation to FIGS. 9 and 10 is exemplary only, and that any other packer router configuration suitable for transferring data packets within a PRISM infrastructure may be employed in the practice of the disclosed systems and methods. For example, a TCP/IP routing scheme may be implemented by configuring PRISM routers 702 as TCP/IP routers, and by assigning respective TCP/IP addresses to each source and destination device (e.g., each ASIC device such as FPGA) within the PRISM infrastructure.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. Circuitry comprising an ASIC device, said ASIC device comprising:
a packet router contained entirely within said ASIC device, said packet router having multiple reader interfaces configured as packet sources and multiple writer interfaces configured as packet destinations and being configured to determine a packet destination for a given data packet from a routing code contained in a header of said given data packet;
a first function or module coupled to a first reader interface and a first writer interface of said packet router, said first function or module being contained entirely within said ASIC device; and
a second function or module coupled to a second reader interface and a second writer interface of said packet router, said second function or module being contained entirely within said ASIC device;
wherein said packet router is further configured to transfer data packets between said first function or module of said ASIC device and said second function or module of said ASIC device by:
receiving first data packets at said first reader interface of said packet router from said first function or module, determining a first destination of each of said received first data packets from a routing code contained within a header of each of said received first data packets, and transmitting said received first data packets from said second writer interface of said packet router to said second function or module based on said first destination determined from said routing code, and
receiving second data packets at said second reader interface of said packet router from said second function or module, determining a second destination of each of said received second data packets from a routing code contained within a header of each of said received first data packets, and transmitting said received second data packets from said first writer interface of said packet router to said first function or module based on said second destination determined from said routing code.

2. The circuitry of claim 1, wherein said ASIC device comprises a FPGA device.

3. The circuitry of claim 2, wherein said first function or module comprises at least one of a first processor or first user-defined circuitry coupled to said packet router of said FPGA device; and wherein said second function or module comprises at least one of a second processor or second user-defined circuitry coupled to said packet router of said FPGA device.

4. The circuitry of claim 3, wherein said FPGA device further comprises at least one external interface coupled to a third reader interface and a third writer interface of said packet router of said FPGA device; and wherein said packet router is further configured to transfer data packets between said first function or module, said second function or module, and said at least one external interface by:
receiving third data packets at said third reader interface of said packet router from said at least one external interface, determining a third destination of each of said received third data packets from a routing code contained within a header of each of said received third data packets, and transmitting said received third data packets from at least one of said first or second writer interfaces of said packet router to a respective one of said first or second function or modules based on said third destination determined from said routing code; and
receiving fourth data packets at said first reader interface of said packet router from said first function or module or receiving fifth data packets at said second reader interface of said packet router from said second function or module, determining a fourth destination of each of said received fourth data packets from a routing code contained within a header of each of said received fourth data packets or determining a fifth destination of each of said received fifth data packets from a routing code contained within a header of each of said received fifth data packets, transmitting said received fourth data packets from said third writer interface of said packet router to said external interface based on said fourth destination determined from said routing code or transmitting said received fifth data packets from said third writer interface of said packet router to said external interface based on said fifth destination determined from said routing code.

5. The circuitry of claim 2, wherein said first function or module comprises at least one processor coupled to said packet router of said FPGA device; wherein said second function or module comprises user-defined circuitry coupled to said packet router of said FPGA device; and wherein said packet router is further configured to transfer data packets between said at least one processor and said user-defined circuitry of said FPGA device based on a destination determined from a routing code contained within a header of each of said transferred data packets.

6. The circuitry of claim 1, wherein a third reader interface and a third writer interface of said packet router of said ASIC device are coupled to a respective packet router of another ASIC device by a data communication link existing between said packet router of said ASIC device and said packet router of said another ASIC device.

7. The circuitry of claim 6, wherein each of said ASIC device and said another ASIC device comprises a serial connection; and wherein said serial connection of said ASIC device is coupled to said serial connection of said another ASIC device to form said data communication link, said data communication link being a duplex serial data communication link that transfers each data packet in whole between said ASIC device and said another ASIC device.

8. The circuitry of claim 6, wherein said ASIC device comprises a FPGA device.

9. The circuitry of claim 8, wherein said first function or module comprises at least one of a first processor or first user-defined circuitry coupled to said packet router of said FPGA device; and wherein said second function or module comprises at least one of a second processor or second user-defined circuitry coupled to said packet router of said FPGA device.

10. The circuitry of claim 8, wherein said first function or module comprises at least one processor coupled to said packet router of said FPGA device; wherein said second function or module comprises user-defined circuitry coupled to said respective packet router of said FPGA device; and wherein said packet router is further configured to transfer data packets between said at least one processor of said FPGA device, said user-defined circuitry of said FPGA device, and said data communication link existing between said FPGA device and said another ASIC device based on a destination determined from a routing code contained within a header of each of said transferred data packets.

11. The circuitry of claim 8, wherein said FPGA device further comprises at least one external interface coupled to a fourth reader interface and a fourth writer interface of said packet router of said FPGA device and wherein said packet router of said FPGA device is coupled to respective reader and writer interfaces of a respective packet router of another ASIC device by said data communication link existing between said external interface of said packet router of said FPGA device and said packet router of said another ASIC device; and wherein said packet router is further configured to transfer data packets between said first function or module, said second function or module, said at least one external interface, and said data communication link existing between said FPGA device and said another ASIC device based on a destination determined from a routing code contained within a header of each of said transferred data packets.

12. Circuitry comprising an ASIC device, said ASIC device comprising:
   at least one packet router contained entirely within said ASIC device, said packet router having multiple reader interfaces configured as packet sources and multiple writer interfaces configured as packet destinations and being configured to determine a packet destination for a given data packet from a routing code contained in a header of said given data packet;
   a first processor module or user function coupled to a first reader interface and a first writer interface of said packet router, said first function or module being contained entirely within said ASIC device; and
   a second processor module or user function coupled to a second reader interface and a second writer interface of said packet router, said second function or module being contained entirely within said ASIC device;
   wherein said packet router interconnects said first processor module or user function of said ASIC device and said second processor module or user function of said ASIC device and is configured to:
      determine a destination of first data packets from a routing code contained within a header of each of said first data packets and to transmit said first data packets from said second writer interface of said packet router to said second processor module or user function based on said destination determined from said routing code of said first data packets, and
      determine a destination of second data packets from a routing code contained within a header of each of said second data packets and to transmit said second data packets from said first writer interface of said packet router to said first processor module or user function based on said destination determined from said routing code of said second data packets.

13. The circuitry of claim 12, wherein said ASIC device comprises a FPGA device.

14. The circuitry of claim 13, wherein said FPGA device further comprises at least one external interface coupled to a third reader interface and a third writer interface of said packet router of said FPGA device; wherein said packet router interconnects said first processor module or user function of said FPGA device, said second processor module or user function of said FPGA device, and said at least one external interface of said FPGA device; and wherein said packet router is configured to determine a destination of third data packets from a routing code contained within a header of each of said third data packets, and to transmit said third data packets from said third writer interface of said packet router to said external interface based on said destination determined from said routing code of said third data packets.

15. The circuitry of claim 13, wherein said FPGA device further comprises at least one I/O connection coupled to a third reader interface and a third writer interface of said packet router of said FPGA device and configured for coupling to at least one I/O connection of another ASIC device; and wherein said packet router of said FPGA device interconnects said first processor module or user function of said FPGA device, said second processor module or user function of said FPGA device, and said at least one I/O connection of said FPGA device; and wherein said packet router is configured to determine a destination of third data packets from a routing code contained within a header of each of said third data packets, and to transmit said third data packets from said third writer interface of said packet router to said at least one I/O connection based on said destination determined from said routing code of said third data packets.

16. The circuitry of claim 15, wherein said at least one I/O connection comprises a serial connection configured to form a duplex serial data communication link that transfers each data packet in whole between said FPGA device and said another ASIC device.

17. The circuitry of claim 13, wherein said FPGA device further comprises at least one external interface coupled to a third reader interface and a third writer interface of said packet router of said FPGA device and at least one I/O connection coupled to a fourth reader interface and a fourth writer interface of said packet router of said FPGA device and; wherein said at least one I/O connection is configured for coupling to at least one I/O connection of another ASIC device; and wherein said packet router interconnects said first processor module or user function of said FPGA device, said second processor module or user function of said FPGA device, said at least one external interface of said FPGA device, and said at least one I/O connection of said FPGA device; wherein said packet router is configured to determine a destination of third data packets from a routing code contained within a header of each of said third data packets, and to transmit said third data packets from said third writer interface of said packet router to said at least one external interface based on said destination determined from said routing code of said third data packets; and wherein said packet router is configured to determine a destination of fourth data packets from a routing code contained within a header of each of said fourth data packets, and to transmit said fourth data packets from said fourth writer interface of said packet router to said at least one I/O connection based on said destination determined from said routing code of said fourth data packets.

18. A method for data transfer, said method comprising transferring at least one data packet between a first function or module of an ASIC device and a second function or module of said ASIC device using a packet router of said ASIC device, said packet router being coupled between said first function or module of said ASIC device and said second function or module of said ASIC device; wherein said packet router is contained entirely within said ASIC device, said packet router having multiple reader interfaces configured as packet sources and multiple writer interfaces configured as packet destinations and being configured to determine a packet destination for a given data packet from a routing code contained in a header of said given data packet; wherein said first function or module is coupled to a first reader interface and a first writer interface of said packet router, said first function or module being contained entirely within said ASIC device;

wherein said second function or module is coupled to a second reader interface and a second writer interface of said packet router, said second function or module being contained entirely within said ASIC device; and wherein said method further comprises:

receiving first data packets at said first reader interface of said packet router from said first function or module, determining a first destination of each of said received first data packets from a routing code contained within a header of each of said received first data packets, and transmitting said received first data packets from said second writer interface of said packet router to said second function or module based on said first destination determined from said routing code, and receiving second data packets at said second reader interface of said packet router from said second function or module, determining a second destination of each of said received second data packets from a routing code contained within a header of each of said received first data packets, and transmitting said received second data packets from said first writer interface of said packet router to said first function or module based on said second destination determined from said routing code.

19. The method of claim 18, wherein said ASIC device comprises a FPGA device.

20. The method of claim 19, wherein said first function or module comprises at least one of a first processor or first user-defined circuitry coupled to said packet router of said FPGA device; and wherein said second function or module comprises at least one of a second processor or second user-defined circuitry coupled to said packet router of said FPGA device.

21. The method of claim 20, wherein said FPGA device further comprises at least one external interface coupled to a third reader interface and a third writer interface of said packet router of said FPGA device; and wherein said method further comprises using said packet router of said ASIC device to transfer data packets between said at least one external interface and at least one of said first function or module of said ASIC device and said second function or module of said ASIC device by;

receiving third data packets at said third reader interface of said packet router from said at least one external interface, determining a third destination of each of said received third data packets from a routing code contained within a header of each of said received third data packets, and transmitting said received third data packets from at least one of said first or second writer interfaces of said packet router to a respective one of said first or second function or modules based on said third destination determined from said routing code; and receiving fourth data packets at said first reader interface of said packet router from said first function or module or receiving fifth data packets at said second reader interface of said packet router from said second function or module, determining a fourth destination of each of said received fourth data packets from a routing code contained within a header of each of said received fourth data packets or determining a fifth destination of each of said received fifth data packets from a routing code contained within a header of each of said received fifth data packets, transmitting said received fourth data packets from said third writer interface of said packet router to said external interface based on said fourth destination determined from said routing code or transmitting said received fifth data packets from said third writer interface of said packet router to said external interface based on said fifth destination determined from said routing code.

22. The method of claim 19, wherein said first function or module comprises at least one processor coupled to said packet router of said FPGA device; wherein said second function or module comprises user-defined circuitry coupled to said packet router of said FPGA device; and wherein said method further comprises using said packet router of said ASIC device to transfer at least one data packet between said at least one processor and said user-defined circuitry of said FPGA device based on a destination determined from a routing code contained within a header of each of said transferred data packets.

23. The method of claim 18, wherein a third reader interface and a third writer interface of said packet router of said ASIC device is are coupled to a respective packet router of another ASIC device by a data communication link existing between said packet router of said ASIC device and said packet router of said another ASIC device; and wherein said method further comprises transferring at least one data packet from said ASIC device to said another ASIC device across said data communication link based on a destination determined from a routing code contained within a header of each of said transferred data packets.

24. The method of claim 23, wherein each of said ASIC device and said another ASIC device comprises a serial connection; and wherein said serial connection of said ASIC device is coupled to said serial connection of said another ASIC device to form said data communication link, said data communication link being a duplex serial data communication link that transfers each data packet in whole between said ASIC device and said another ASIC device.

25. The method of claim 23, wherein said ASIC device comprises a FPGA device.

26. The method of claim 25, wherein said first function or module comprises at least one of a first processor or first user-defined circuitry coupled to said packet router of said FPGA device; wherein said second function or module comprises at least one of a second processor or second user-defined circuitry coupled to said packet router of said FPGA device.

27. The method of claim 25, wherein said first function or module comprises at least one processor coupled to said packet router of said FPGA device; wherein said second function or module comprises user-defined circuitry coupled to said respective packet router of said FPGA device; and wherein said method further comprises using said packet router of said ASIC device to transfer at least one data packet between said data communication link and at least one of said processor and said user-defined circuitry based on a destination determined from a routing code contained within a header of each of said transferred data packets.

28. The method of claim 25, wherein said FPGA device further comprises at least one external interface coupled to a fourth reader interface and a fourth writer interface of said packet router of said FPGA device and wherein said packet router of said FPGA device is coupled to respective reader and writer interfaces of a respective packet router of another ASIC device by said data communication link existing between said external interface of said packet router of said FPGA device and said packet router of said another ASIC device; and wherein said method further comprises using said packet router to transfer at least one data packet between said external interface and at least one of said first function or module, said second function or module, and said data communication link existing between said FPGA device and said another ASIC device based on a destination determined from a routing code contained within a header of each of said transferred data packets.

* * * * *

UNITED STATES PATENT AND TRADEMARK OFFICE
CERTIFICATE OF CORRECTION

PATENT NO. : 7,689,757 B2  Page 1 of 1
APPLICATION NO. : 11/529713
DATED : March 30, 2010
INVENTOR(S) : Jerry Yancey et al.

It is certified that error appears in the above-identified patent and that said Letters Patent is hereby corrected as shown below:

In claim 15, column 18, line 13, delete "and".

In claim 23, column 20, line 14, delete "is".

Signed and Sealed this

Eighteenth Day of May, 2010

David J. Kappos
*Director of the United States Patent and Trademark Office*